(12) United States Patent
Wada

(10) Patent No.: US 7,224,398 B2
(45) Date of Patent: May 29, 2007

(54) SURVEILLANCE CAMERA APPARATUS

(75) Inventor: Jyoji Wada, Kanagawa-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 790 days.

(21) Appl. No.: 10/654,844

(22) Filed: Sep. 4, 2003

(65) Prior Publication Data
US 2004/0075739 A1 Apr. 22, 2004

(30) Foreign Application Priority Data
Sep. 5, 2002 (JP) ............................. 2002-260273

(51) Int. Cl.
H04N 5/225 (2006.01)
H04N 7/18 (2006.01)
(52) U.S. Cl. ...................... 348/373; 348/143
(58) Field of Classification Search ............... None
See application file for complete search history.

(56) References Cited

U.S. PATENT DOCUMENTS

| 4,654,703 | A | * | 3/1987 | Viera | 348/143 |
| 4,918,473 | A | * | 4/1990 | Blackshear | 348/143 |
| 5,289,091 | A | * | 2/1994 | Wada | 318/282 |
| 5,627,616 | A | * | 5/1997 | Sergeant et al. | 348/143 |
| 5,631,699 | A | * | 5/1997 | Saito | 348/211.6 |
| 6,354,749 | B1 | * | 3/2002 | Pfaffenberger, II | 348/143 |
| 6,392,693 | B1 | * | 5/2002 | Wakiyama et al. | 348/143 |

FOREIGN PATENT DOCUMENTS

GB 2 319 712 5/1998
WO 95/35624 12/1995

\* cited by examiner

Primary Examiner—Lin Ye
Assistant Examiner—Luong T. Nguyen
(74) Attorney, Agent, or Firm—Pearne & Gordon LLP

(57) ABSTRACT

Herein disclosed is a surveillance camera apparatus which comprises a camera unit, a camera retaining assembly for retaining the camera unit, a camera checking unit for checking whether or not the camera unit is normally operated, a camera driving unit for driving the camera unit to be moved in a surveillance area where the camera unit performs a surveillance operation, and a non-surveillance area where the camera unit performs no surveillance operation, and where the camera unit is capable of being checked, a light emitting unit designed to assume two different states consisting of a first state under which the light emitting unit emits the light, and a second state under which the light emitting unit stops emitting the light, a state setting unit for setting the light emitting unit to selectively assume the first and second states, and a drive control unit for controlling the camera driving unit, the drive control unit being operative to assume a first operation state under which the camera unit is driven to be moved within the surveillance area, and a second operation state under which the camera unit is driven to be moved into engagement with the state setting unit in the non-surveillance area to allow the light emitting unit to emit the light to have the camera unit take the image of the light, and the camera checking unit being operative to check the camera unit based on the image of the light.

5 Claims, 22 Drawing Sheets

FIG.9
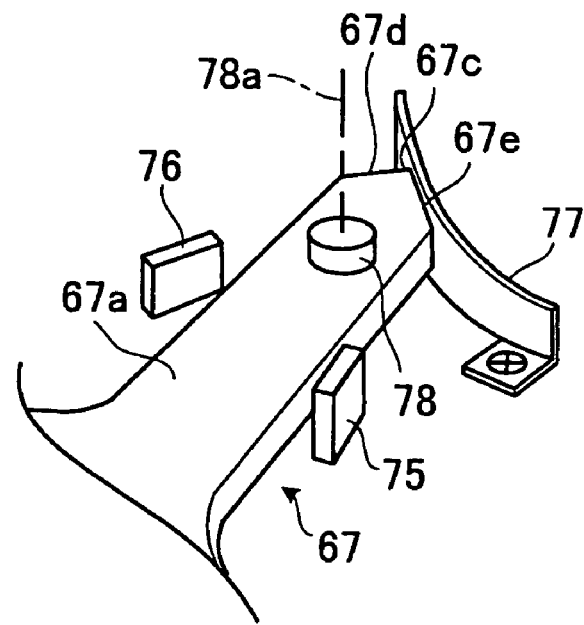
(a)
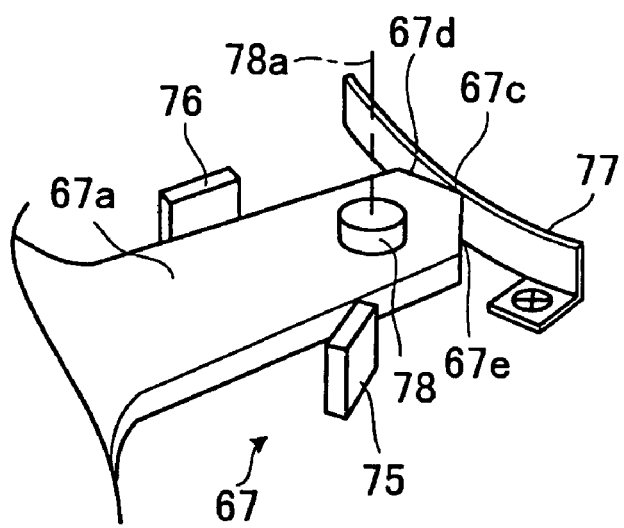
(b)

SURVEILLANCE CAMERA APPARATUS

BACKGROUND OF THE INVENTION

1. Field of the Invention

The present invention relates to a surveillance camera apparatus, and more particularly to a surveillance camera apparatus partially constituting a surveillance system for watching a specific object such as for example unqualified people and other intruders intruding into a special room that permits people with permission to enter.

2. Description of the Related Art

Up until now, there have been proposed a wide variety of conventional surveillance camera apparatuses. One of the typical examples of the surveillance camera apparatuses thus known is shown in FIGS. 21 and 22 as having a reference number 200. The conventional surveillance camera apparatus 200 comprises a camera unit 202 for taking an image of a specific object, and a camera retaining assembly 203 for retaining the camera unit 202. The camera retaining assembly 203 includes a stationary member 201 secured to a fixed structure such as for example a ceiling wall forming part of a building, and a side wall forming part of an elevator cage, a holder shaft 205 revolvably supported on the stationary member 201 and having a holder revolution axis 205a around which the holder shaft 205 is revolvable with respect to the stationary member 201, a holder member 206 fixedly mounted on the holder shaft 205, a camera shaft 207 revolvably supported on the holder member 206 and having a camera revolution axis 207a in perpendicular relationship with the holder revolution axis 205a of the holder shaft 205 and around which the camera shaft 207 is revolvable with respect to the holder member 206 in unison with the camera unit 202.

The conventional surveillance camera apparatus 200 further comprises a dome cover 204 for accommodating the camera unit 202, and a case member (not shown) integrally formed with the dome cover 204. The dome cover 204 is in the form of hemispheric shape, and made of a transparent material to have the camera unit 202 take the image of the specific object therethrough. The dome cover 204 has an opening 204a and a spherical portion 204b as seen by a two-dot chain line in FIG. 21.

As best shown in FIG. 22, the conventional surveillance camera apparatus 200 further comprises a camera driving unit 223 for driving the camera unit 202 to have the camera unit 202 revolve around the camera revolution axis 207a of the camera shaft 207 with respect to the holder member 206, and a holder driving unit 215 for driving the holder member 206 to have the holder member 206 revolve around the holder revolution axis 205a with respect to the stationary member 201. The camera driving unit 223 includes a camera electric motor 216 for transmitting revolution torques to the camera shaft 207 to have the camera unit 202 revolve around the camera revolution axis 207a with respect to the holder member 206, and a camera encoder 217 for counting and encoding the revolution number of the camera electric motor 216, while the holder driving unit 215 includes a holder electric motor 208 for transmitting revolution torques to the holder shaft 205 to have the holder member 206 revolve around the holder revolution axis 205a with respect to the stationary member 201, and a holder encoder 209 for counting and encoding the revolution number of the holder electric motor 208.

The conventional surveillance camera apparatus 200 electrically connected to an exterior controller producing a position signal indicative of the position of the camera unit 202, and a camera drive control unit 218 for controlling the camera driving unit 223 to have the camera driving unit 223 drive the camera unit 202 to have the camera unit 202 revolve around the camera revolution axis 207a with respect to the holder member 206, and a holder drive control unit 210 for controlling the holder driving unit 215 to have the holder driving unit 215 drive the holder member 206 to have the holder member 206 revolve around the holder revolution axis 205a with respect to the stationary member 201.

The camera drive control unit 218 includes an input terminal 222 for inputting the position signal, a camera position range memory 220 for previously storing therein a camera position range, for example plus or minus 90 degree of the angle, in which the camera unit 202 is revolvable around the camera revolution axis 207a with respect to the holder member 206 to have the camera unit 202 take the image of the object, a camera position detector 221 for detecting a camera position at which the camera unit 202 is positioned based on the revolution number of the camera electric motor 216 encoded by the camera encoder 217, and a camera motor controller 219 for controlling the camera electric motor 216 based on the camera position range stored by the camera position range memory 220, the camera position detected by the camera position detector 221, and the position signal inputted through the input terminal 222.

The holder drive control unit 210 includes an input terminal 214 for inputting the position signal, a holder position range memory 212 for previously storing therein a holder position range, for example plus or minus 90 degree of the angle, in which the holder member 206 is revolvable around the holder revolution axis 205a with respect to the stationary member 201 to have the camera unit 202 take the image of the object, a holder position detector 213 for detecting a holder position at which the holder member 206 is positioned based on the revolution number of the holder electric motor 208 encoded by the holder encoder 209, and a holder motor controller 211 for controlling the holder electric motor 208 based on the holder position range stored by the holder position range memory 212, the holder position detected by the holder position detector 213, and the position signal inputted through the input terminal 214.

The camera unit 202 is movable with respect to the stationary member 201 in a surveillance area which is restricted by the camera position range stored by the camera position range memory 220 and the holder position range stored by the holder position range memory 212.

The conventional surveillance camera apparatus thus constructed as previously mentioned, however, encounters such a problem that a movable area where the camera unit is capable of mechanically moving with respect to the stationary member 201 is slightly larger than the surveillance area to minimally take account of different sizes and installation of structural members constituting part of the conventional surveillance camera apparatus. The slightly large area, heretofore, has not been used due to an excessive small area for use in other purposes.

On the other hand, there has been various operations involving this kind of surveillance camera apparatus. These operations includes a camera unit test for checking a lens, a filter changing operation for changing different infrared filters, a lens cleaning operation for cleaning the lens, and a camera locking operation for locking the camera unit to the camera retaining assembly when the surveillance camera apparatus is transported from one place to other place. These operations has so far been carried out by operators so that these operations are laborious and tedious for the operators.

SUMMARY OF THE INVENTION

It is, therefore, an object of the present invention to provide a surveillance camera apparatus which is operated to have a camera unit moved in a surveillance area where the camera unit is operated to perform a surveillance operation and a non-surveillance area where the camera unit is operated to perform a non-surveillance operation including a camera unit test for checking a lens and other conditions involving the camera unit, a filter changing operation for changing different infrared filters, a lens cleaning operation for cleaning the lens, a dome locking operation for locking a dome cover to a camera retaining assembly, and a camera locking operation for locking the camera unit to the camera retaining assembly when the surveillance camera apparatus is transported from one place to other place.

It is another object of the present invention to provide a surveillance camera apparatus which can take advantage of the movement of the camera unit to ensure the non-surveillance operations as previously mentioned various operations in the non-surveillance area larger than that of the conventional surveillance camera apparatus.

It is a further object of the present invention to provide a surveillance camera apparatus which can allow the camera unit to perform the laborious and tedious operations inherent to the conventional surveillance camera apparatus.

In accordance with a first aspect of the present invention, there is provided a surveillance camera apparatus, comprising: a camera unit for taking an image of a specific object; a camera retaining assembly for retaining the camera unit; a camera checking unit for checking whether or not the camera unit is normally operated; a camera driving unit supported on the camera retaining assembly to drive the camera unit to have the camera unit moved with respect to the camera retaining assembly in two different areas consisting of a surveillance area where the camera unit is capable of taking the image of the specific object to perform a surveillance operation, and a non-surveillance area where the camera unit is incapable of taking the image of the specific object to perform no surveillance operation, and where the camera unit is capable of being checked by the camera checking unit whether or not the camera unit is normally operated; a light emitting unit supported on the camera retaining assembly and designed to assume two different states consisting of a first state under which the light emitting unit is operative to emit the light, and a second state under which the light emitting unit is operative to stop emitting the light; a state setting unit supported on the camera retaining assembly and designed to set the light emitting unit to selectively assume the first and second states, the camera driving unit being adapted to drive the camera unit to have the camera unit moved into engagement with the state setting unit to have the state setting unit set the light emitting unit to assume the first state, and adapted to drive the camera unit to have the camera unit moved out of engagement with the state setting unit to have the state setting unit set the light emitting unit to assume the second state; and a drive control unit for controlling the camera driving unit to have the camera driving unit drive the camera unit to have the camera unit moved with respect to the camera retaining assembly in the two different areas, the drive control unit being operative to assume two different operation states consisting of a first operation state under which the camera unit is driven by the camera driving unit to be moved within the surveillance area, and a second operation state under which the camera unit is driven by the camera driving unit to be moved into engagement with the state setting unit in the non-surveillance area to allow the light emitting unit to emit the light to have the camera unit take the image of the light emitted by the light emitting unit, and which the camera unit is driven by the camera driving unit to be moved out of engagement with the state setting unit to allow the light emitting unit to stop emitting the light, and the camera checking unit being operative to check whether or not the camera unit is normally operated based on the image of the light emitted by the light emitting unit.

The camera checking unit may be adapted to produce a test signal, the light emitting unit having a light modulator for modulating the light emitted by the light emitting unit in response to the test signal produced by the camera checking unit, the camera unit producing an image signal indicative of the image taken by the camera unit, and the camera checking unit being adapted to compare the image signal produced by camera unit with the test signal to check whether or not the camera unit is normally operated.

The camera retaining assembly may include: a holder member; and a camera shaft revolvably supported on the holder member and having a camera revolution axis around which the camera shaft is revolvable with respect to the holder member, the camera shaft is driven in unison with the camera unit by the camera driving unit to have the camera unit revolvably moved around the camera revolution axis with respect to the holder member.

In accordance with a second aspect of the present invention, there is provided a surveillance camera apparatus, comprising: a camera unit for taking an image of a specific object and having a lens for passing therethrough light forming the image taken by the camera unit; a camera retaining assembly for retaining the camera unit; a light filtering unit for filtering light forming image taken by the camera unit, the light filtering unit having a filter frame supported by the camera unit, and an optical filter fixed with the filter frame to cut part of light, and the filter frame being movable with respect to the camera unit to assume two different operation positions consisting of a first operation position where the optical filter covers the lens of the camera unit to allow the camera unit to be able to take the image with the optical filter, and a second operation position where the optical filter uncovers the lens of the camera unit to allow the camera unit to be able to take the image without the optical filter; frame stop means held stationary with respect to the camera retaining assembly and designed to stop the filter frame of the light filtering unit from moving with respect to the camera retaining assembly beyond a predetermined range; a camera driving unit supported on the camera retaining assembly to drive the camera unit to have the camera unit moved with respect to the camera retaining assembly in two different areas consisting of a surveillance area where the camera unit is capable of taking the image of the specific object to perform a surveillance operation, and a non-surveillance area where the camera unit is incapable of taking the image of the specific object to perform no surveillance operation, and where the filter frame of the light filtering unit is capable of selectively assuming the two different operation positions, the camera driving unit being adapted to drive the camera unit to have the camera unit moved with respect to the camera retaining assembly to have the filter frame of the light filtering unit move into and out of engagement with the frame stop means; and a drive control unit for controlling the camera driving unit to have the camera driving unit drive the camera unit to have the camera unit moved with respect to the camera retaining assembly in the two different areas, the drive control unit being operative to assume two different operation states consisting of a first operation state under which the camera unit is driven by the camera driving unit to be moved within the surveillance area, and a second operation state under which the camera unit is driven by the camera driving unit to be moved with respect to the camera retaining assembly to have the filter frame of the light filtering unit move into and out of engagement with the frame stop means, and which the filter frame of the light filtering unit is moved with respect to the camera retaining assembly to allow the filter frame of the light filtering unit to selectively assume the two different operation positions under the state that the filter frame of the light filtering unit is in engagement with the frame stop means.

The optical filter of the light filtering unit may cut infrared-light.

The camera retaining assembly may include: a stationary member; and a camera shaft revolvably supported on the stationary member and having a camera revolution axis around which the camera shaft is revolvable with respect to the stationary member, the camera shaft is driven in unison with the camera unit by the camera driving unit to have the camera unit revolvably moved around the camera revolution axis with respect to the stationary member.

The camera unit may include: a cylindrical body having the lens accommodated therein, the filter frame of the light filtering unit positioned on the camera unit and including an arm frame portion having a front end, an intermediate portion, and a rear end, and a finger frame portion integrally formed with to extend downwardly of the front end of the arm frame portion to be capable of having the optical filter of the light filtering unit cover the lens of the camera unit, the intermediate portion having a pivotal axis around which the arm frame portion is pivotable with respect to the cylindrical body of the camera unit, and the rear end having a center ridge, and two cut faces separated from each other at the center ridge; a pair of regulation members fixedly mounted on the cylindrical body of the camera unit and angularly spaced apart from each other to have the arm frame portion of the filter frame disposed therebetween, the regulating members having respective inner faces opposing to each other and radially extending to regulate the motion of the filter frame; and a resilient member fixedly mounted on the cylindrical body of the camera unit to be contactable with the cut faces of the rear end of the arm frame portion of the filter frame to resiliently urge the arm frame portion of the filter frame to regulate the movement of the filter frame, the resilient member having a resilient force so selected that the filter frame is movable with respect to the camera unit under the state that the filter frame of the light filtering unit is in engagement with the frame stop means, and that the filter frame is unmovable with respect to the camera unit under the state that the filter frame of the light filtering unit is out of engagement with the frame stop means.

In accordance with a third aspect of the present invention, there is provided a surveillance camera apparatus, comprising: a camera unit for taking an image of a specific object and having a lens for passing therethrough light forming the image taken by the camera unit; a camera retaining assembly for retaining the camera unit; a light filtering unit for filtering light forming the image taken by the camera unit, the light filtering unit having a filter frame supported by the camera unit, and a plurality of optical filters fixed with the filter frame and designed to cut part of light, and the filter frame being movable with respect to the camera unit to assume a plurality of operation positions where each of the optical filter covers the lens of the camera unit to allow the camera unit to be able to take the image with each of the optical filter; frame stop means held stationary with respect to the camera retaining assembly and designed to stop the filter frame of the light filtering unit from moving with respect to the camera retaining assembly beyond a predetermined range; a camera driving unit supported on the camera retaining assembly to drive the camera unit to have the camera unit moved with respect to the camera retaining assembly in two different areas consisting of a surveillance area where the camera unit is capable of taking the image of the specific object to perform a surveillance operation, and a non-surveillance area where the camera unit is incapable of taking the image of the specific object to perform no surveillance operation, and where the filter frame of the light filtering unit is capable of selectively assuming the operation positions, the camera driving unit being adapted to drive the camera unit to have the camera unit moved with respect to the camera retaining assembly to have the filter frame of the light filtering unit moved into and out of engagement with the frame stop means; and a drive control unit for controlling the camera driving unit to have the camera driving unit drive the camera unit to have the camera unit moved with respect to the camera retaining assembly in the two different areas, the drive control unit being operative to assume two different operation states consisting of a first operation state under which the camera unit is driven by the camera driving unit to be moved within the surveillance area, and a second operation state under which the camera unit is driven by the camera driving unit to be moved with respect to the camera retaining assembly to have the filter frame of the light filtering unit move into and out of engagement with the frame stop means, and which the filter frame of the light filtering unit is moved with respect to the camera retaining assembly to allow the filter frame of the light filtering unit to selectively assume the different operation positions under the state that the filter frame of the light filtering unit is in engagement with the frame stop means.

In accordance with a fourth aspect of the present invention, there is provided a surveillance camera apparatus, comprising: a camera unit for taking an image of a specific object and having a lens for passing therethrough light forming the image taken by the camera unit; a camera retaining assembly for retaining the camera unit; a lens cleaning unit held stationary with respect to the camera retaining assembly and designed to cleaning the lens of the camera unit; a camera driving unit supported on the camera retaining assembly to drive the camera unit to have the camera unit moved with respect to the camera retaining assembly in two different areas consisting of a surveillance area where the camera unit is capable of taking the image of the specific object to perform a surveillance operation, and a non-surveillance area where the camera unit is incapable of taking the image of the specific object to perform no surveillance operation, and where the lens of the camera unit is capable of cleaned by the lens cleaning unit, the camera driving unit being adapted to drive the camera unit to have the camera unit moved with respect to the camera retaining assembly to have the lens of the camera unit slidably move into and out of contact with the lens cleaning unit; and a drive control unit for controlling the camera driving unit to have the camera driving unit drive the camera unit to have the camera unit moved with respect to the camera retaining assembly in the two different areas, the drive control unit being operative to assume two different operation states consisting of a first operation state under which the camera unit is driven to be moved within the surveillance area, and a second operation state which the camera unit is driven by the camera driving unit to be moved with respect to the camera retaining assembly to have the lens of the camera unit slidably move into contact with the lens cleaning unit in the non-surveillance area to allow the lens cleaning unit to clean the lens of the camera unit, and which the camera unit is driven by the camera driving unit to be moved with respect to the camera retaining assembly to have the lens of the camera unit move out of contact with the lens cleaning unit.

The camera unit may be adapted to focus on the specific object of which the image taken by the camera unit, and adapted to producing an image signal indicative of the image taken by the camera unit, and the surveillance camera apparatus may further comprise: an image judging unit for judging whether or not the image taken by the camera unit is in focus on the specific object based on the image signal produced by the camera unit; and a lens judging unit for judging whether or not the lens of the camera unit is dirty based on results judged by the image judging unit, the drive control unit being operative to assume each of the two different operation states in accordance with results judged by the lens judging unit.

In accordance with a fifth aspect of the present invention, there is provided a surveillance camera apparatus, comprising: a camera unit for taking an image of a specific object; a camera retaining assembly for retaining the camera unit; a dome cover mounted on the camera retaining assembly to cover the camera unit; coupling means for coupling the dome cover with the camera retaining assembly; a camera driving unit supported on the camera retaining assembly to drive the camera unit to have the camera unit moved with respect to the camera retaining assembly in two different areas consisting of a surveillance area where the camera unit is capable of taking the image of the specific object, and a non-surveillance area where the camera unit is incapable of taking the image of the specific object to perform no surveillance operation, and where the coupling means is operated to have the dome cover disengaged out of the camera retaining assembly when the camera driving unit is operative to drive the camera unit to have the camera unit moved with respect to the camera retaining assembly to have the camera unit move into engagement with the coupling means; and a drive control unit for controlling the camera driving unit to have the camera unit moved with respect to the camera retaining assembly between two different positions consisting of a first position where the camera unit is held in engagement with the coupling means to have the dome cover disengaged out of the camera retaining assembly, and a second position where the camera unit is held out of engagement with the coupling means to have the dome cover engaged with the camera retaining assembly.

The drive control unit may be operative to assume two different operation states consisting of a first operation state under which the camera unit is driven by the camera driving unit to be moved within the surveillance area, and a second operation state under which the camera unit is driven by the camera driving unit to be moved with respect to the camera retaining assembly to have the camera unit move into engagement with the coupling means within the non-surveillance area to allow the coupling means to disengage the dome cover out of the camera retaining assembly, and which the camera unit is driven by the camera driving unit to be moved with respect to the camera retaining assembly to have the camera unit move out of engagement with the coupling means to allow the coupling means to engage the dome cover with the camera retaining assembly.

The dome cover may include a dome portion partly in the form of a spherical shape and made of a transparent material and a cylindrical portion integrally formed with the dome portion, and the coupling means may include: a fixed hook member fixedly mounted on the camera retaining assembly in the dome cover; a bracket member fixedly mounted on the cylindrical portion of the dome cover to extend inwardly from the inner surface of the cylindrical portion of the dome cover toward the fixed hook member; a pivotal member supported on the bracket member and having a center axis, the pivotal member having a locking portion extending toward the fixed hook member to be engageable with the fixed hook member, and an unlocking portion extending toward the camera unit and angularly spaced apart from the locking portion, and the pivotal member being pivotable around the center axis to assume a first angular position where the locking portion is engaged with the fixed hook member, and a second angular position where the locking portion is disengaged from the fixed hook member; and a resilient member for resiliently urge the pivotal member toward the first angular position of the pivotal member to have the locking portion engaged with the fixed hook member; whereby the locking portion of the pivotal member is brought into engagement with the fixed hook member when the dome cover is mounted on the camera retaining assembly to have the pivotal member pivoted to the first angular position from the second angular position against the resilient force of the resilient member, and the locking portion of the pivotal member is brought out of engagement with the fixed hook member when the camera unit is engaged with the unlocking portion to have the pivotal member pivoted to the second angular position from the first angular position against the resilient force of the resilient member.

The camera unit may include: a cylindrical body having the lens accommodated therein, an engagement projection fixedly mounted on the cylindrical body and being held in face-to-face relationship with the unlocking portion of the pivotal member when the camera unit is driven by the camera driving unit to be moved with respect to the camera retaining assembly within the non-surveillance area, whereby the engagement projection is engaged with the unlocking portion of the pivotal member when the pivotal member is pivoted to the second angular position from the first angular position against the resilient force of the resilient member.

The resilient member may be constituted by a tensile coil spring having one end fixed to the cylindrical portion of the dome cover and the other end fixed to the unlocking portion of the pivotal member to resiliently urge the pivotal member toward the first angular position.

The camera retaining assembly may include: a stationary member having the fixed hook member securely mounted thereon, a holder shaft revolvably supported on the stationary member and having a holder revolution axis around which the holder shaft is revolvable with respect to the stationary member, a holder member fixedly mounted on the holder shaft, a camera shaft revolvably supported on the holder member and having a camera revolution axis in perpendicular relationship with the holder revolution axis of the holder shaft and around which the camera shaft is revolvable with respect to the holder member, and a channel member securely mounted on the camera shaft to hold the camera unit.

In accordance with a sixth aspect of the present invention, there is provided a surveillance camera apparatus, comprising: a camera unit for taking an image of a specific object;

a camera retaining assembly for retaining the camera unit; a camera driving unit supported on the camera retaining assembly to drive the camera unit to have the camera unit moved with respect to the camera retaining assembly in two different areas consisting of a surveillance area where the camera unit is capable of taking the image of the specific object to perform a surveillance operation, and a non-surveillance area where the camera unit is incapable of taking the image of the specific object to perform no surveillance operation; and a camera locking unit securely mounted on the camera retaining assembly to have the camera unit lockable with the camera retaining assembly when the camera unit is moved with respect to the camera retaining assembly into the non-surveillance area.

The camera retaining assembly may include: a stationary member; a holder shaft revolvably supported on the stationary member and having a holder revolution axis around which the holder shaft is revolvable with respect to the stationary member; a holder member having a first plate portion fixedly mounted on the holder shaft, and a second plate portion perpendicular to and integrally formed with the first plate portion; a camera shaft revolvably supported on the second plate portion of the holder member and having a camera revolution axis in perpendicular relationship with the holder revolution axis of the holder shaft and around which the camera shaft is revolvable with respect to the holder member; a channel member securely mounted on the camera shaft to hold the camera unit; and a camera locking unit has a base portion securely connected to the first plate portion of the holder member, and bifurcated finger portions having end surfaces partly in the form of a spherical shape to ensure that the camera unit is locked by the camera locking unit with the cylindrical body of the camera unit partly received by the bifurcated finger portions.

The bifurcated finger portions of the camera locking unit may be made of an elastic material and the end surface of the bifurcated finger portions is partly formed to have a diameter smaller than that of the cylindrical body of the camera unit to ensure that the camera unit is locked by the camera locking unit with the cylindrical body of the camera unit partly received by the bifurcated finger portions when the camera unit is moved with respect to the camera retaining assembly into the non-surveillance area.

BRIEF DESCRIPTION OF THE DRAWINGS

The objects, features and advantages of the present invention will become apparent as the description proceeds when taken in conjunction with the accompanying drawings, in which:

FIG. 9a is a fragmentary perspective view of an arm frame portion having cut faces at the end thereof and showing a first position where one of the cut faces of the arm frame portion is held in pressing contact with a resilient member in FIG. 8;

FIG. 9b is a fragmentary perspective view similar to FIG. 9a but showing a second position where the other of the cut faces of the arm frame portion is held in pressing contact with the resilient member;

DESCRIPTION OF THE EMBODIMENTS

Figure 1:
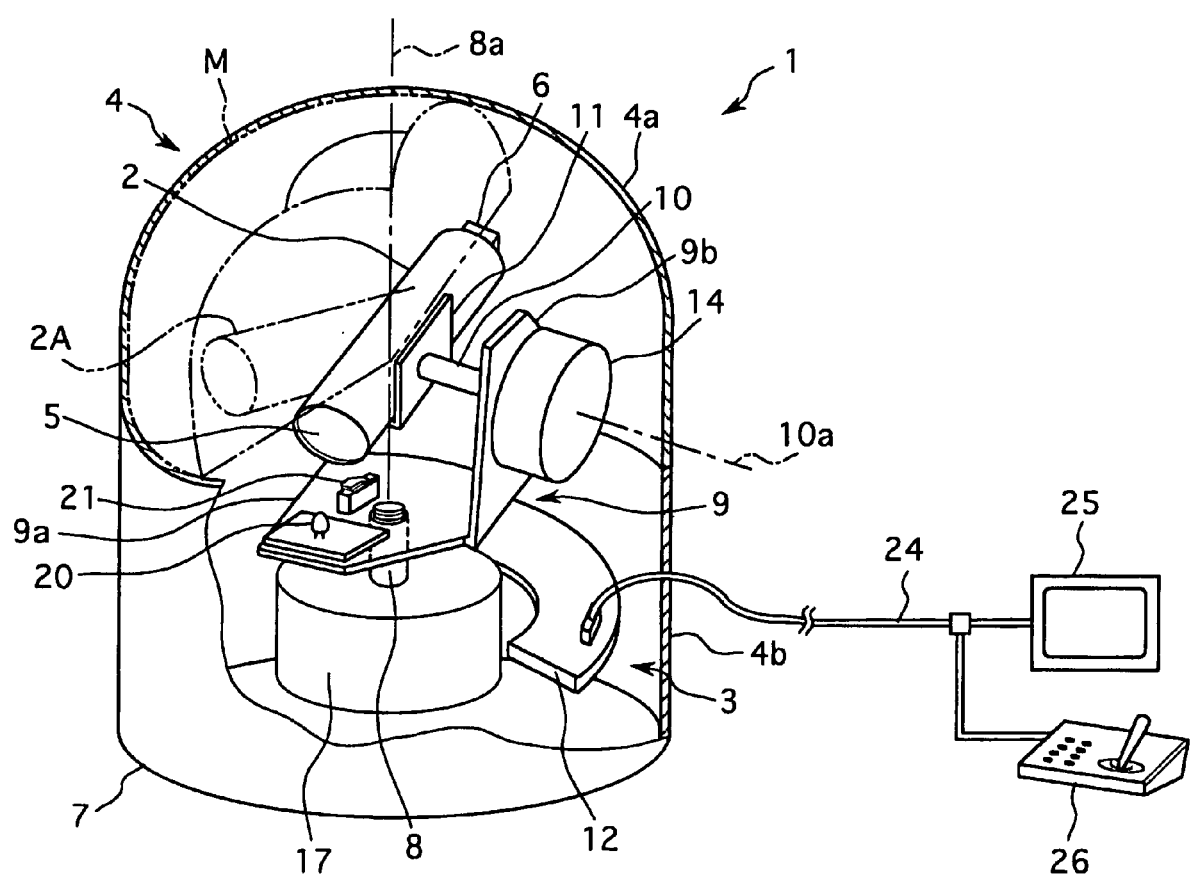
FIG. 1 is a perspective view of a first preferred embodiment of a surveillance camera apparatus according to the present invention and showing a dome cover partly fragmentary.
Figure 2:
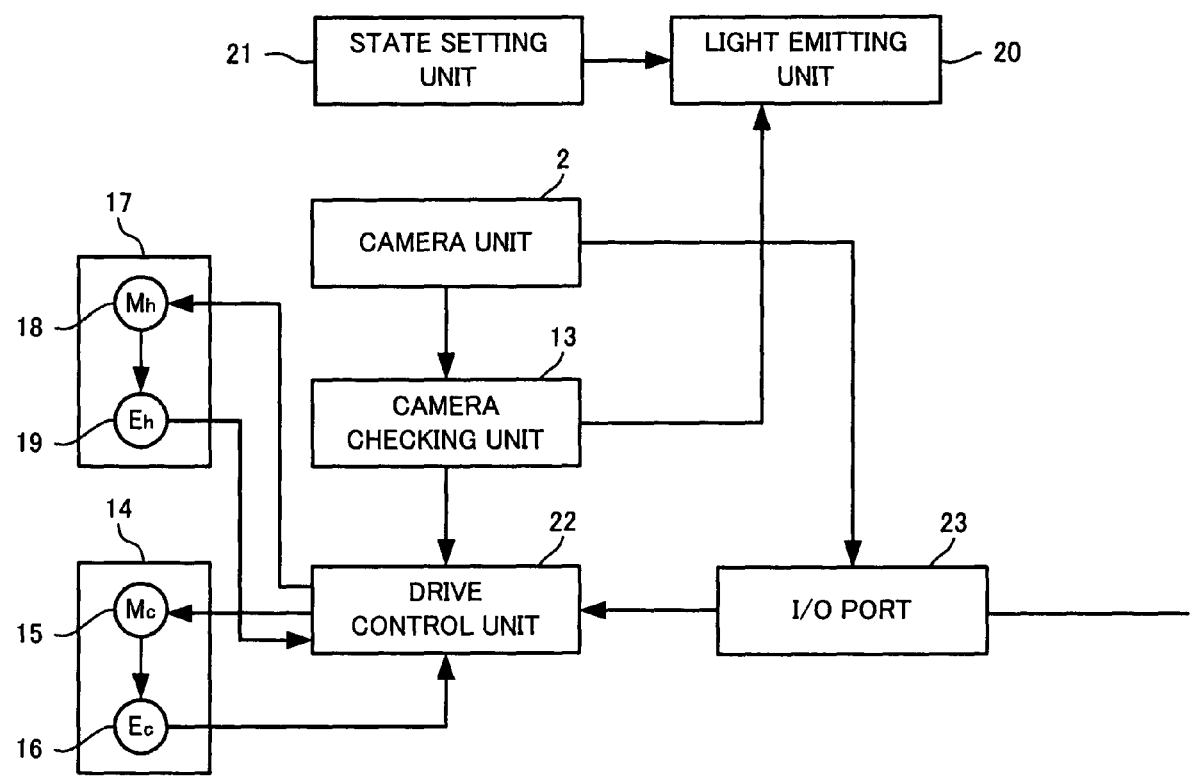
FIG. 2 is a block diagram of the surveillance camera apparatus according to the present invention shown in FIG. 1.
Figure 3:
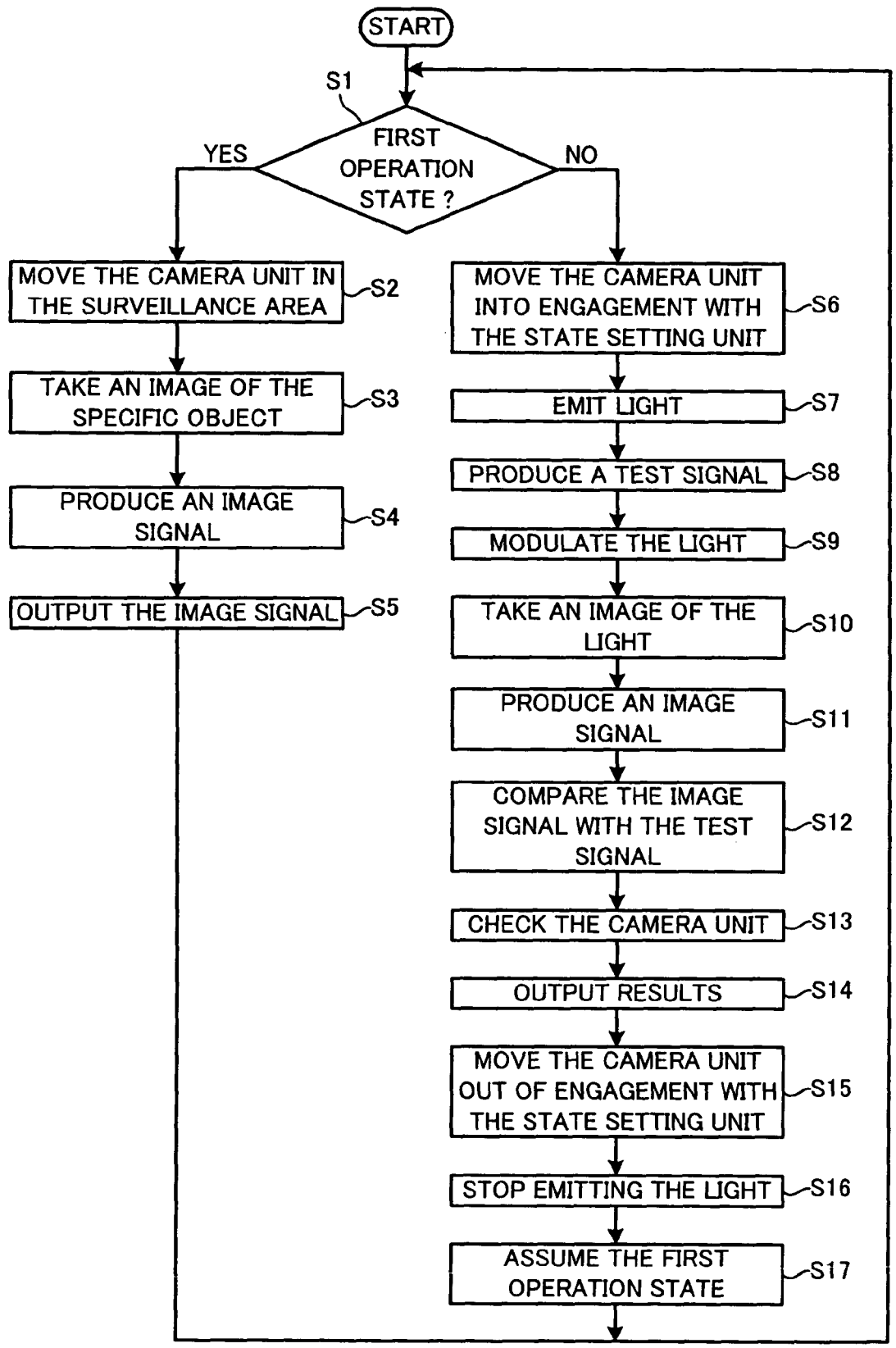
FIG. 3 is a flow chart of the surveillance camera apparatus according to the present invention shown in FIG. 1.

Referring now to the drawings, in particular to FIGS. 1 to 3, there is shown a first preferred embodiment of the surveillance camera apparatus according to the present invention. Throughout the following detailed description, similar reference numbers refer to respective similar elements or parts in all figures of the drawings.

The first preferred embodiment of the surveillance camera apparatus is shown in FIGS. 1 and 2 as having a reference number 1, and comprises a camera unit 2 for taking an image of a specific object, a camera retaining assembly 3 for retaining the camera unit 2, and a dome cover 4 mounted on the camera retaining assembly 3 to cover the camera unit 2. The camera unit 2 is operative to produce an image signal indicative of the image taken by the camera unit 2, and includes a lens 5 having a light axis and capable of passing therethrough light forming the image taken by the camera unit 2, and a charge coupled device unit 6 having a plurality of charge coupled devices to translate the light passed through the lens 5 to the image signal.

The camera retaining assembly 3 includes a stationary member 7 secured to a fixed structure such as for example a ceiling wall forming part of a building, and a side wall forming part of an elevator cage, a holder shaft 8 revolvably supported on the stationary member 7 and having a holder revolution axis 8a around which the holder shaft 8 is revolvable with respect to the stationary member 7, a holder member 9 fixedly mounted on the holder shaft 8, a camera shaft 10 revolvably supported on the holder member 9 and having a camera revolution axis 10a in perpendicular relationship with the holder revolution axis 8a of the holder shaft 8 and around which the camera shaft 10 is revolvable with respect to the holder member 9, and a channel member 11 securely mounted on the camera shaft 10 to hold the camera unit 2.

The holder shaft 8 has a first end portion revolvably connected to the stationary member 7, and a second end portion securely connected to the holder member 9 to ensure that the holder member 9 is revolvable with respect to the stationary member 7 around the holder revolution axis 8a. The camera shaft 10 has a fixed end portion revolvably connected to the holder member 9 and a free end portion extending from the holder member 9 to securely support the channel member 11 to ensure that the camera unit 2 is revolvable with respect to the holder member 9 around the camera revolution axis 10a. The holder member 9 is in the form of L-shape in cross-section and has a first plate portion 9a having an outer surface paralleled to that of the stationary member 7, and a second plate portion 9b integrally formed with the first plate portion 9a to have an outer surface perpendicular to that of the first plate portion 9a. The camera retaining assembly 3 further comprises a support plate 12 securely supported on first plate portion 9a of the holder member 9 to be revolvable together with the holder member 9.

The dome cover 4 includes a dome portion 4a partly in the form of a spherical shape and made of a transparent material, and a cylindrical portion 4b integrally formed with the dome portion 4a and made of a transparent material or a non-transparent material.

The surveillance camera apparatus 1 further comprises a camera checking unit 13 (see FIG. 2) securely mounted on the support plate 12 of the camera retaining assembly 3 to check whether or not the camera unit 2 is normally operated.

The surveillance camera apparatus 1 further comprises a camera driving unit 14 securely supported on the holder member 9 of the camera retaining assembly 3 to drive the camera unit 2 to have the camera unit 2 revolvably moved around the camera revolution axis 10a with respect to the holder member 9 of the camera retaining assembly 3 in two different areas consisting of a surveillance area where the camera unit 2 is capable of taking the image of the specific object to perform a surveillance operation, and a non-surveillance area where the camera unit 2 is incapable of taking the image of the specific object to perform no surveillance operation, and where the camera unit 2 is capable of being checked by the camera checking unit 13 whether or not the camera unit 2 is normally operated. In this embodiment shown in FIG. 1, the term "surveillance area" is intended to indicate an area "M" to perform a surveillance operation by allowing the outside light to pass therethrough to the lens 5 of the camera unit 2, while the term "non-surveillance area" is intended to indicate an area excluding the area "M" to perform a non-surveillance operation by allowing the outside light not to pass therethrough to the lens 5 of the camera unit 2.

The camera driving unit 14 includes a camera electric motor 15 (see FIG. 2) for transmitting revolution torques to the camera shaft 10 to have the camera unit 2 revolve around the camera revolution axis 10a with respect to the holder member 9 of the camera retaining assembly 3, and a camera encoder 16 (see FIG. 2) for counting and encoding the revolution number of the camera electric motor 15. It is preferable that the camera electric motor 15 and the camera encoder 16 be combined to be constituted by a step-motor.

The surveillance camera apparatus 1 further comprises a holder driving unit 17 securely supported on the stationary member 7 of the camera retaining assembly 3 to drive the holder member 9 of the camera retaining assembly 3 to have the holder member 9 of the camera retaining assembly 3 revolvably moved with respect to the stationary member 7 of the camera retaining assembly 3. The holder driving unit 17 includes a holder electric motor 18 (see FIG. 2) for transmitting revolution torques to the holder shaft 8 to have the holder member 9 of the camera retaining assembly 3 revolve around the holder revolution axis 8a with respect to the stationary member 7 of the camera retaining assembly 3, and a holder encoder 19 (see FIG. 2) for counting and encoding the revolution number of the holder electric motor 18. It is preferable that the holder electric motor 18 and the holder encoder 19 be combined to be constituted by a step-motor.

The surveillance camera apparatus 1 further comprises a light emitting unit 20 having a light-emit diode securely supported on the first plate portion 9a of the holder member 9 of the camera retaining assembly 3. The light emitting unit 20 is designed to assume two different states consisting of a first state under which the light emitting unit 20 is operative to emit the light, and a second state under which the light emitting unit 20 is operative to stop emitting the light. The surveillance camera apparatus 1 further comprises a state setting unit 21 securely supported on the first plate portion 9a of the holder member 9 of the camera retaining assembly 3 to set the light emitting unit 20 to selectively assume the first and second states.

The camera driving unit 14 is adapted to drive the camera unit 2 to have the camera unit 2 moved into engagement with the state setting unit 21 to have the state setting unit 21 set the light emitting unit 20 to assume the first state, and adapted to drive the camera unit 2 to have the camera unit 2 moved out of engagement with the state setting unit 21 to have the state setting unit 21 set the light emitting unit 20 to assume the second state. The state setting unit 21 is positioned where the camera unit 2 is capable of being in engagement with the state setting unit 21. The light emitting unit 20 is in the vicinity of the state setting unit 21 to have the camera unit 2 take the image of light emitted by the light emitting unit 20 under the state that the camera unit 2 is in engagement with the state setting unit 21.

The surveillance camera apparatus 1 further comprises a drive control unit 22 (see FIG. 2) securely mounted on the support plate 12 of the camera retaining assembly 3 to control the camera driving unit 14 and the holder driving unit 17 to have the camera driving unit 14 drive the camera unit 2 to be moved with respect to the camera retaining assembly 3 in the two different areas.

The drive control unit 22 is operative to assume two different operation states consisting of a first operation state under which the camera unit 2 is driven by the camera driving unit 14 to be moved within the surveillance area of the camera unit 2, and a second operation state under which the camera unit 2 is driven by the camera driving unit 14 to be moved into engagement with the state setting unit 21 to allow the light emitting unit 20 to emit the light to have the camera unit 2 take the image of the light emitted by the light emitting unit 20 while the camera unit 2 is driven by the camera driving unit 14 to be moved out of engagement with the state setting unit 21 to allow the light emitting unit 20 to stop emitting the light in the non-surveillance area of the camera unit 2.

The camera checking unit 13 is operative to check the camera unit 2 whether or not the camera unit 2 is normally operated based on the image of the light emitted by the light emitting unit 20. The camera checking unit 13 is adapted to produce a test signal indicative of predetermined information. The light emitting unit 20 has a light modulator for modulating the light emitted by the light emitting unit 20 in response to the test signal produced by the camera checking unit 13. The camera checking unit 13 is adapted to compare the image signal produced by camera unit 2 with the test signal to check whether or not the camera unit 2 is normally operated.

The surveillance camera apparatus 1 further comprises an input/output port 23, which is hereinafter simply referred to as "I/O port", securely mounted on the support plate 12 of the camera retaining assembly 3, and electrically connected through an electric line 24 to an exterior apparatus having a monitor unit 25 and a controller 26. The I/O port 23 is designed to output the image signal produced by the camera unit 2 to the monitor unit 25 to have the monitor unit 25 display and record the image represented by the image signal, as well as to output a result signal indicative of results checked by camera checking unit 13 to the monitor unit 25 to have the monitor unit 25 display and record the results checked by camera checking unit 13. The I/O port 23 is adapted to input from the controller 26 a position signal for changing the position and posture of the camera unit 2, and first and second operation signals for respectively setting the drive control unit 22 to assume the first and second operation states.

The operation of the surveillance camera apparatus 1 will be described in detail hereinafter with reference to FIG. 3.

Under the condition that the drive control unit 22 assumes the first operation state in the step S1, the camera unit 2 is driven by the camera driving unit 14 while the holder member 9 of the camera retaining assembly 3 is driven by the holder driving unit 17 when the position signal inputted from the controller 26 through the I/O port 23 is received by the drive control unit 22. At this time, the camera unit 2 is moved in the surveillance area with respect to the stationary member 7 of the camera retaining assembly 3, such as for example, as represented by the reference number "2A" in FIG. 1 in the step S2.

The image of the specific object is then taken by the camera unit 2 in the step S3, and the image signal is produced by the camera unit 2 in the step S4. The image signal produced by the camera unit 2 is then outputted through the I/O port 23 to the monitor unit 25 for displaying and recording the image in the step S5.

When the second operation signal inputted through the I/O port 23 to the drive control unit 22, the drive control unit 22 assumes the second operation state.

Under the condition that the drive control unit 22 assumes the second operation state in the step S1, the camera unit 2 is driven by the camera driving unit 14 to be moved into engagement with the state setting unit 21 in the non-surveillance area in the step S6. The light emitting unit 20 is then set by the state setting unit 21 to be assumed the first state, and the light is then emitted by the light emitting unit 20 in the step S7. The test signal is then produced by the camera checking unit 13 in the step S8, and the light emitted by the light emitting unit 20 is then modulated by the light modulator of the light emitting unit 20 in response to the test signal produced by the camera checking unit 13 in the step S9.

The image of the light modulated by the light modulator of the light emitting unit 20 is then taken by the camera unit 2 in the step S10, and the image signal representing the image of the light modulated by the light modulator of the light emitting unit 20 is then produced by the camera unit 2 in the step S11. The image signal produced by the camera unit 2 is compared by the camera checking unit 13 with the test signal in the step S12, and the camera unit 2 is then checked by the camera checking unit 13 whether or not to be normally operated based on the compared image signal produced by the camera unit 2 and test signal in the step S13.

The result signal representing the results checked by camera checking unit 13 is then outputted through the I/O port 23 to the monitor unit 25 for displaying and recording the results checked by camera checking unit 13 in the step S14. The camera unit 2 is then driven by the camera driving unit 14 to be moved out of engagement with the state setting unit 21 in the step S15. The light emitting unit 20 then assumes the second state, and the light is stopped by the light emitting unit 20 to be emitted in the step S16. The drive control unit 22 then assumes the first operation state in the step S17.

While there has been described in the forgoing embodiment about the fact that the light emitting unit 20 having a light-emit diode, the light emitting unit 20 may have other objects emitting light.

As will be seen from the above description, the first embodiment of the surveillance camera apparatus according to the present invention can take advantage the non-surveillance area to ensure the operation to check whether or not the camera unit is normally operated, while the camera unit is moved in the surveillance area to perform a surveillance operation.

Although there has been described in the above about the first preferred embodiment of the surveillance camera apparatus according to the present invention, this embodiment may be replaced by the second to sixth preferred embodiments of the surveillance camera apparatus according to the present invention in order to attain the objects of the present invention. The second to sixth preferred embodiments of the surveillance camera apparatus will then be described hereinafter.

Referring now to the drawings, in particular to FIGS. 4 to 7, there is shown a second preferred embodiment of the surveillance camera apparatus according to the present invention. Throughout the following detailed description, similar reference numbers refer to respective similar elements or parts in all figures of the drawings.

Figure 4:
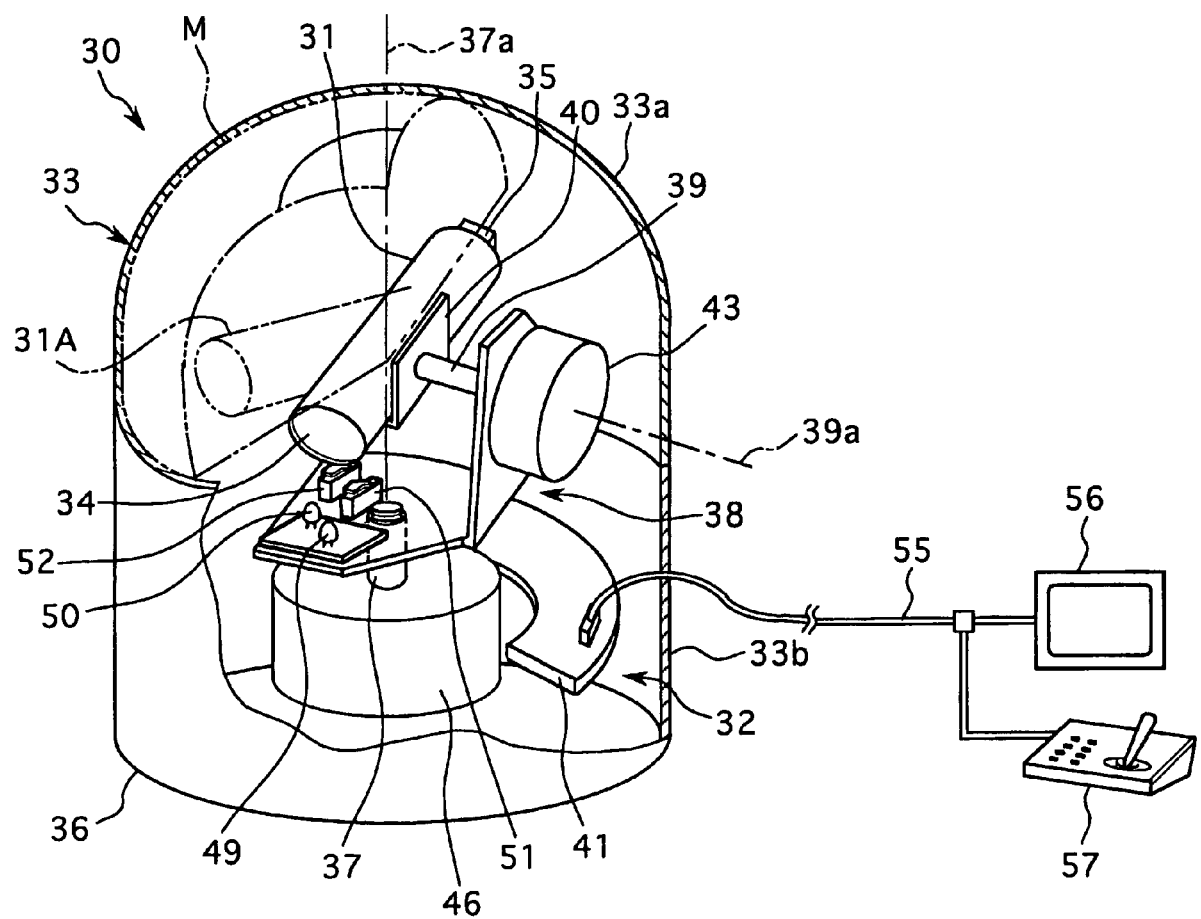
FIG. 4 is a perspective view of a second preferred embodiment of the surveillance camera apparatus according to the present invention and showing a dome cover partly fragmentary.
Figure 5:
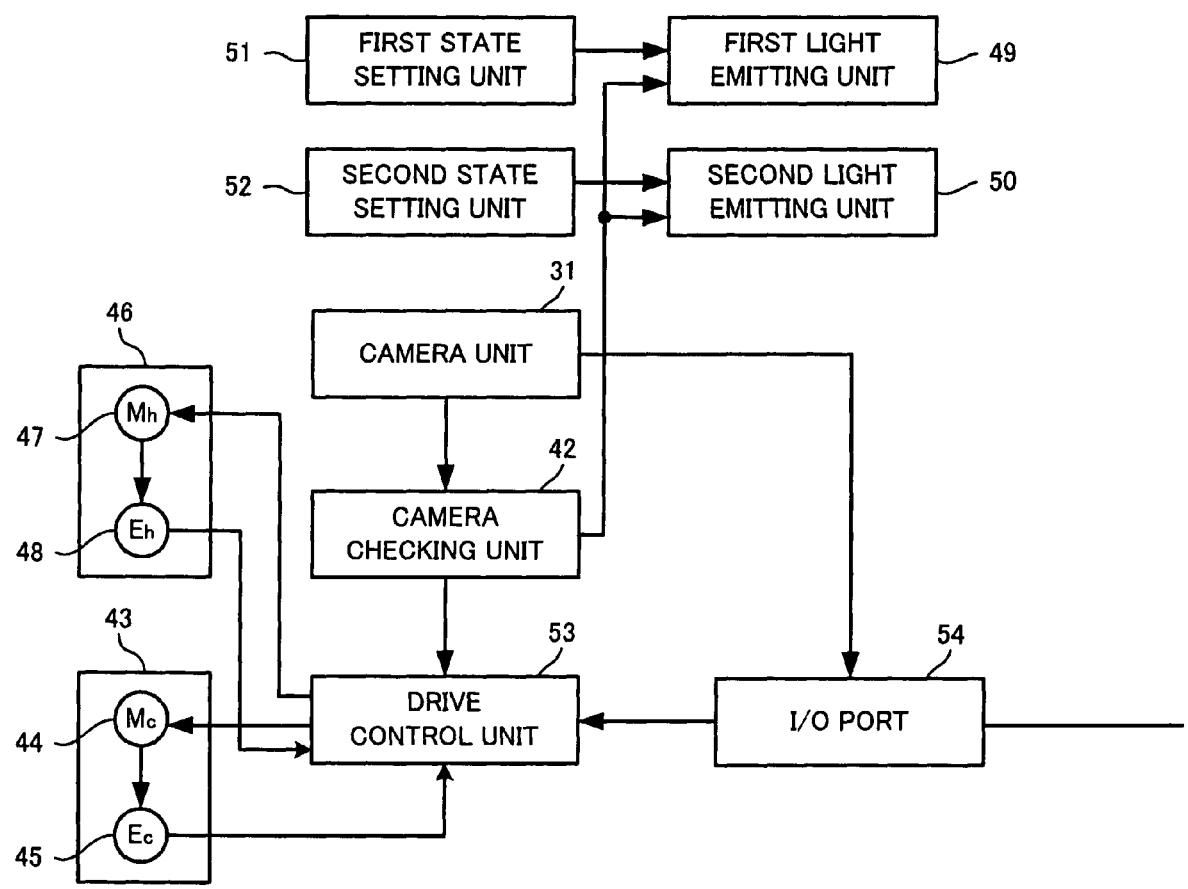
FIG. 5 is a block diagram of the surveillance camera apparatus according to the present invention shown in FIG. 4.

The second preferred embodiment of the surveillance camera apparatus is shown in FIGS. 4 and 5 as having a reference number 30, and comprises a camera unit 31 for taking an image of a specific object, a camera retaining assembly 32 for retaining the camera unit 31, and a dome cover 33 mounted on the camera retaining assembly 32 to cover the camera unit 31. The camera unit 31 is operative to produce an image signal indicative of the image taken by the camera unit 31, and includes a lens 34 having a light axis and capable of passing therethrough light forming the image taken by the camera unit 31, and a charge coupled device unit 35 having a plurality of charge coupled devices to translate the light passed through the lens 34 to the image signal.

The camera retaining assembly 32 includes a stationary member 36 secured to a fixed structure such as for example a ceiling wall forming part of a building, and a side wall forming part of an elevator cage, a holder shaft 37 revolvably supported on the stationary member 36 and having a holder revolution axis 37a around which the holder shaft 37 is revolvable with respect to the stationary member 36, a holder member 38 fixedly mounted on the holder shaft 37, a camera shaft 39 revolvably supported on the holder member 38 and having a camera revolution axis 39a in perpendicular relationship with the holder revolution axis 37a of the holder shaft 37 and around which the camera shaft 39 is revolvable with respect to the holder member 38, and a channel member 40 securely mounted on the camera shaft 39 to hold the camera unit 31.

The holder shaft 37 has a first end portion revolvably connected to the stationary member 36, and a second end portion securely connected to the holder member 38 to ensure that the holder member 38 is revolvable with respect to the stationary member 36 around the holder revolution axis 37a. The camera shaft 39 has a fixed end portion revolvably connected to the holder member 38 and a free end portion extending from the holder member 38 to securely support the channel member 40 to ensure that the camera unit 31 is revolvable with respect to the holder member 38 around the camera revolution axis 39a. The holder member 38 is in the form of L-shape in cross-section and has a first plate portion 38a having an outer surface paralleled to that of the stationary member 36, and a second plate portion 38b integrally formed with the first plate portion 38a to have an outer surface perpendicular to that of the first plate portion 38a. The camera retaining assembly 32 further comprises a support plate 41 securely supported on first plate portion 38a of the holder member 38 to be revolvable together with the holder member 38.

The dome cover 33 includes a dome portion 33a partly in the form of a spherical shape and made of a transparent material, and a cylindrical portion 33b integrally formed with the dome portion 33a and made of a transparent material or a non-transparent material.

The surveillance camera apparatus 30 further comprises a camera checking unit 42 (see FIG. 5) securely mounted on the support plate 41 of the camera retaining assembly 32 to check whether or not the camera unit 31 is normally operated.

The surveillance camera apparatus 30 further comprises a camera driving unit 43 securely supported on the holder member 38 of the camera retaining assembly 32 to drive the camera unit 31 to have the camera unit 31 revolvably moved around the camera revolution axis 39a with respect to the holder member 38 of the camera retaining assembly 32 in two different areas consisting of a surveillance area where the camera unit 31 is capable of taking the image of the specific object to perform a surveillance operation, and a non-surveillance area where the camera unit 31 is incapable of taking the image of the specific object to perform no surveillance operation, and where the camera unit 31 is capable of being checked by the camera checking unit 42 whether or not the camera unit 31 is normally operated. In this embodiment shown in FIG. 4, the term "surveillance area" is intended to indicate an area "M" to perform a surveillance operation by allowing the outside light to pass therethrough to the lens 34 of the camera unit 31, while the term "non-surveillance area" is intended to indicate an area excluding the area "M" to perform a non-surveillance operation by allowing the outside light not to pass therethrough to the lens 34 of the camera unit 31.

The camera driving unit 43 includes a camera electric motor 44 (see FIG. 5) for transmitting revolution torques to the camera shaft 39 to have the camera unit 31 revolve around the camera revolution axis 39a with respect to the holder member 38 of the camera retaining assembly 32, and a camera encoder 45 (see FIG. 5) for counting and encoding the revolution number of the camera electric motor 44. It is preferable that the camera electric motor 44 and the camera encoder 45 be combined to be constituted by a step-motor.

The surveillance camera apparatus 30 further comprises a holder driving unit 46 securely supported on the stationary member 36 of the camera retaining assembly 32 to drive the holder member 38 of the camera retaining assembly 32 to have the holder member 38 of the camera retaining assembly 32 revolvably moved with respect to the stationary member 36 of the camera retaining assembly 32. The holder driving unit 46 includes a holder electric motor 47 (see FIG. 5) for transmitting revolution torques to the holder shaft 37 to have the holder member 38 of the camera retaining assembly 32 revolve around the holder revolution axis 37a with respect to the stationary member 36 of the camera retaining assembly 32, and a holder encoder 48 (see FIG. 5) for counting and encoding the revolution number of the holder electric motor 47. It is preferable that the holder electric motor 47 and the holder encoder 48 be combined to be constituted by a step-motor.

The surveillance camera apparatus 30 further comprises a first light emitting unit 49 having a light-emit diode securely supported on the first plate portion 38a of the holder member 38 of the camera retaining assembly 32, and a second light emitting unit 50 having a light-emit diode securely supported on the first plate portion 38a of the holder member 38 of the camera retaining assembly 32. In this embodiment, the light emitted by the second light emitting unit 50 is different from the light emitted by the first light emitting unit 49 in color.

The first light emitting unit 49 is designed to assume two different states consisting of a first state under which the first light emitting unit 49 is operative to emit the light, and a second state under which the first light emitting unit 49 is operative to stop emitting the light. The second light emitting unit 50 is designed to assume two different states consisting of a first state under which the second light emitting unit 50 is operative to emit the light, and a second state under which the second light emitting unit 50 is operative to stop emitting the light.

The surveillance camera apparatus 30 further comprises a first state setting unit 51 securely supported on the first plate portion 38a of the holder member 38 of the camera retaining assembly 32 to set the first light emitting unit 49 to selectively assume the first and second states, and a second state setting unit 52 securely supported on the first plate portion 38a of the holder member 38 of the camera retaining assembly 32 to set the second light emitting unit 50 to selectively assume the first and second states.

The camera driving unit 43 is adapted to drive the camera unit 31 to have the camera unit 31 moved into engagement with each of the first and second state setting units 51 and 52 to have the first and second state setting units 51 and 52 respectively set the first and second light emitting units 49 and 50 to assume the first state. The camera driving unit 43 is, on the other hand, adapted to drive the camera unit 31 to have the camera unit 31 moved out of engagement with each of the first and second state setting units 51 and 52 to have the first and second state setting units 51 and 52 respectively set the first and second light emitting units 49 and 50 to assume the second state.

The first and second state setting units 51 and 52 are positioned where the camera unit 31 is capable of being in engagement with each of the first and second state setting units 51 and 52. The first light emitting unit 49 is in the vicinity of the first state setting unit 51 to have the camera unit 31 take the image of light emitted by the first light emitting unit 49 under the state that the camera unit 31 is in engagement with the first state setting unit 51. The second light emitting unit 50 is in the vicinity of the second state setting unit 52 to have the camera unit 31 take the image of light emitted by the second light emitting unit 50 under the state that the camera unit 31 is in engagement with the second state setting unit 52.

The surveillance camera apparatus 30 further comprises a drive control unit 53 (see FIG. 5) securely mounted on the support plate 41 of the camera retaining assembly 32 to control the camera driving unit 43 and the holder driving unit 46 to have the camera driving unit 43 drive the camera unit 31 to be moved with respect to the camera retaining assembly 32 in the two different areas.

The drive control unit 53 is operative to assume two different operation states consisting of a first operation state under which the camera unit 31 is driven by the camera driving unit 43 to be moved within the surveillance area of the camera unit 31, and a second operation state under which the camera unit 31 is driven by the camera driving unit 43 to be moved into and out of engagement with each of the first and second state setting units 51 and 52.

The drive control unit 53 is operative to assume two different checking modes under the second operation state. The checking modes includes a first checking mode under which the camera unit 31 is driven by the camera driving unit 43 to be moved into engagement with of the first state setting unit 51 to allow the first light emitting unit 49 to emit the light to have the camera unit 31 take the image of the light emitted by the first light emitting unit 49 while the camera unit 31 is driven by the camera driving unit 43 to be moved out of engagement with the first state setting unit 51 to allow the first light emitting unit 49 to stop emitting the light in the non-surveillance area of the camera unit 31. The checking modes further includes a second checking mode under which the camera unit 31 is driven by the camera driving unit 43 to be moved into engagement with of the second state setting unit 52 to allow the second light emitting unit 50 to emit the light to have the camera unit 31 take the image of the light emitted by the second light emitting unit 50 while the camera unit 31 is driven by the camera driving unit 43 to be moved out of engagement with the second state setting unit 52 to allow the second light emitting unit 50 to stop emitting the light in the non-surveillance area of the camera unit 31.

The camera checking unit 42 is operative to check the camera unit 31 whether or not the camera unit 31 is normally operated based on the image of the light emitted by each of the first and second light emitting units 49 and 50. The camera checking unit 42 is adapted to produce a test signal indicative of predetermined information. The first and second light emitting units 49 and 50 respectively have a light modulator for modulating the light emitted by the first and second light emitting units 49 and 50 in response to the test signal produced by the camera checking unit 42. The camera checking unit 42 is adapted to compare the image signal produced by camera unit 31 with the test signal to check whether or not the camera unit 31 is normally operated.

The surveillance camera apparatus 30 further comprises an I/O port 54 securely mounted on the support plate 41 of the camera retaining assembly 32, and electrically connected through an electric line 55 to an exterior apparatus having a monitor unit 56 and a controller 57. The I/O port 54 is designed to output the image signal produced by the camera unit 31 to the monitor unit 56 to have the monitor unit 56 display and record the image represented by the image signal, as well as to output a result signal indicative of results checked by camera checking unit 42 to the monitor unit 56 to have the monitor unit 56 display and record the results checked by camera checking unit 42. The I/O port 54 is adapted to input from the controller 57 a position signal for changing the position and posture of the camera unit 31, first and second operation signals for respectively setting the drive control unit 53 to assume the first and second operation states, and a checking mode signal for setting the drive control unit 53 to assume the checking modes.

Figure 6:
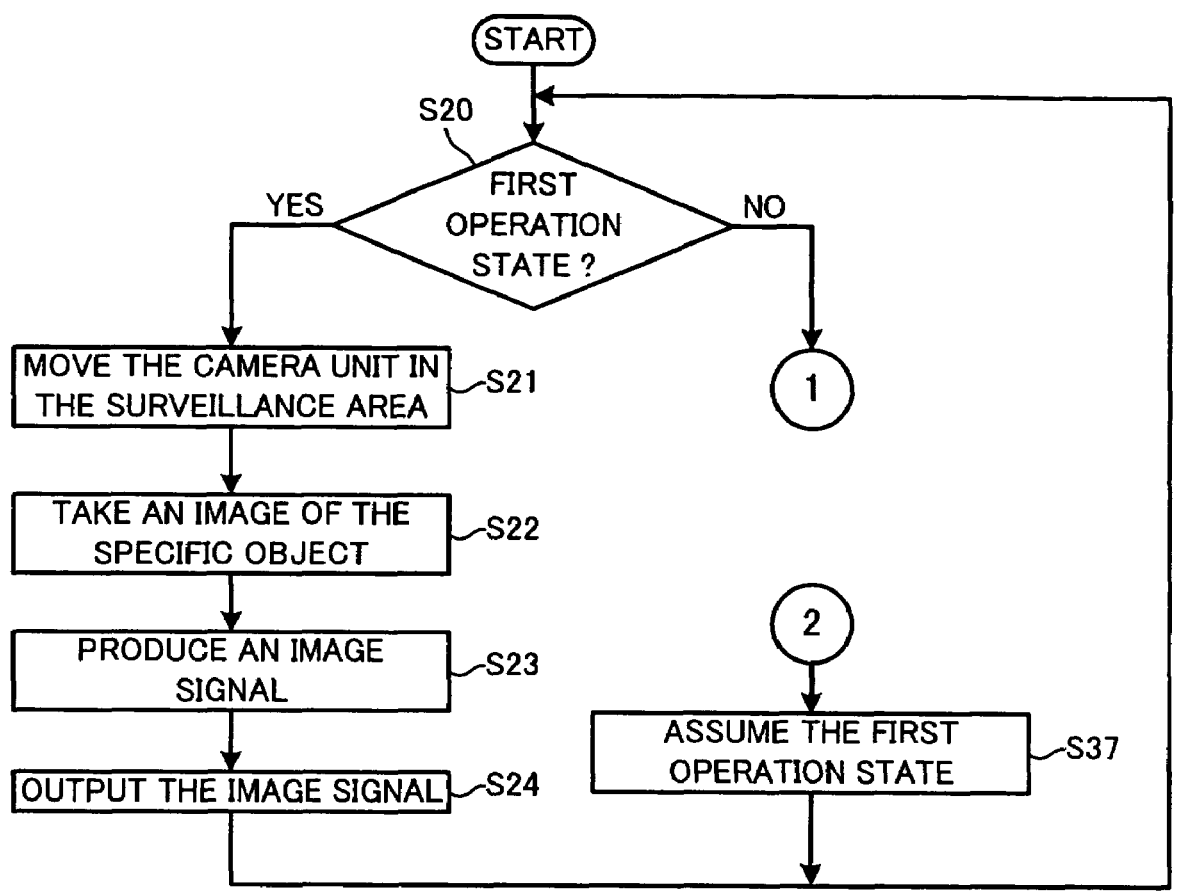
FIG. 6 is a first flow chart of the surveillance camera apparatus according to the present invention shown in FIG. 4.
Figure 7:
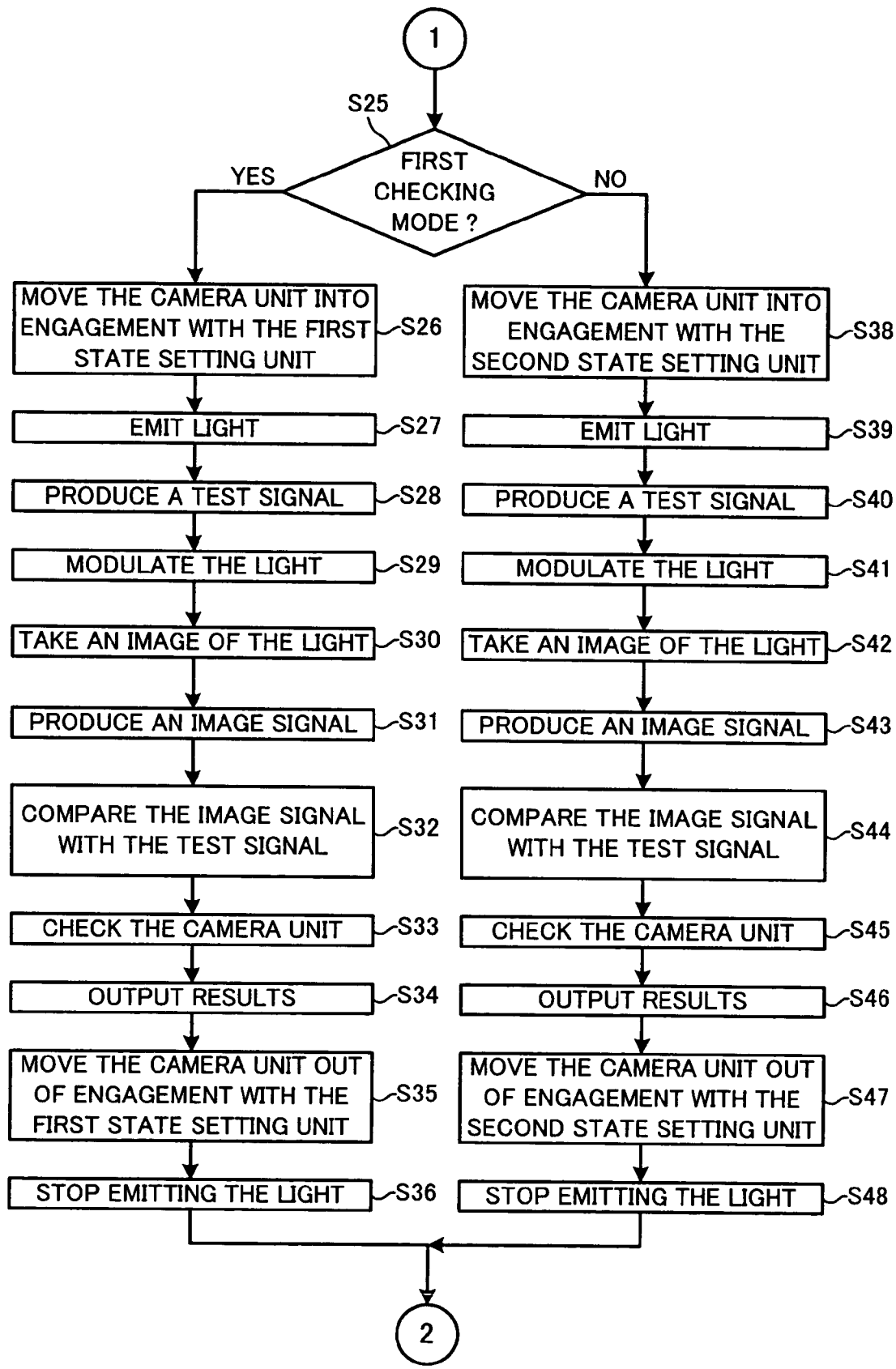
FIG. 7 is a second flow chart of the surveillance camera apparatus according to the present invention shown in FIG. 4.

The operation of the surveillance camera apparatus 30 will be described in detail hereinafter with reference to FIGS. 6 and 7.

Under the condition that the drive control unit 53 assumes the first operation state in the step S20, the camera unit 31 is driven by the camera driving unit 43 while the holder member 38 of the camera retaining assembly 32 is driven by the holder driving unit 46 when the position signal inputted from the controller 57 through the I/O port 54 is received by the drive control unit 53. At this time, the camera unit 31 is moved in the surveillance area with respect to the stationary member 36 of the camera retaining assembly 32, such as for example, as represented by the reference number "31A" in FIG. 4 in the step S21.

The image of the specific object is then taken by the camera unit 31 in the step S22, and the image signal is produced by the camera unit 31 in the step S23. The image signal produced by the camera unit 31 is then outputted through the I/O port 54 to the monitor unit 56 for displaying and recording the image in the step S24.

When the second operation signal inputted through the I/O port 54 to the drive control unit 53, the drive control unit 53 assumes the second operation state. Under the condition that the drive control unit 53 assumes the second operation state in the step S20, the drive control unit 53 assumes each of the checking modes in response to the checking mode signal inputted through the I/O port 54 to the drive control unit 53.

Under the condition that the drive control unit 53 assumes the first checking mode in the step S25, the camera unit 31 is driven by the camera driving unit 43 to be moved into engagement with the first state setting unit 51 in the non-surveillance area in the step S26. The first light emitting unit 49 is then set by the first state setting unit 51 to be assumed the first state, and the light is then emitted by the first light emitting unit 49 in the step S27. The test signal is then produced by the camera checking unit 42 in the step S28, and the light emitted by the first light emitting unit 49 is then modulated by the light modulator of the first light emitting unit 49 in response to the test signal produced by the camera checking unit 42 in the step S29.

The image of the light modulated by the light modulator of the first light emitting unit 49 is then taken by the camera unit 31 in the step S30, and the image signal representing the image of the light modulated by the light modulator of the first light emitting unit 49 is then produced by the camera unit 31 in the step S31. The image signal produced by the camera unit 31 is compared by the camera checking unit 42 with the test signal in the step S32, and the camera unit 31 is then checked by the camera checking unit 42 whether or not to be normally operated based on the compared image signal produced by the camera unit 31 and test signal in the step S33.

The result signal representing the results checked by camera checking unit 42 is then outputted through the I/O port 54 to the monitor unit 56 for displaying and recording the results checked by camera checking unit 42 in the step S34. The camera unit 31 is then driven by the camera driving unit 43 to be moved out of engagement with the first state setting unit 51 in the step S35. The first light emitting unit 49 then assumes the second state, and the light is stopped by the first light emitting unit 49 to be emitted in the step S36. The drive control unit 53 then assumes the first operation state in the step S37.

Under the condition that the drive control unit 53 assumes the first checking mode in the step S25, the camera unit 31 is driven by the camera driving unit 43 to be moved into engagement with the second state setting unit 52 in the non-surveillance area in the step S38. The second light emitting unit 50 is then set by the second state setting unit 52 to be assumed the first state, and the light is then emitted by the second light emitting unit 50 in the step S39. The test signal is then produced by the camera checking unit 42 in the step S40, and the light emitted by the second light emitting unit 50 is then modulated by the light modulator of the second light emitting unit 50 in response to the test signal produced by the camera checking unit 42 in the step S41.

The image of the light modulated by the light modulator of the second light emitting unit 50 is then taken by the camera unit 31 in the step S42, and the image signal representing the image of the light modulated by the light modulator of the second light emitting unit 50 is then produced by the camera unit 31 in the step S43. The image signal produced by the camera unit 31 is compared by the camera checking unit 42 with the test signal in the step S44, and the camera unit 31 is then checked by the camera checking unit 42 whether or not to be normally operated based on the compared image signal produced by the camera unit 31 and test signal in the step S45.

The result signal representing the results checked by camera checking unit 42 is then outputted through the I/O port 54 to the monitor unit 56 for displaying and recording the results checked by camera checking unit 42 in the step S46. The camera unit 31 is then driven by the camera driving unit 43 to be moved out of engagement with the second state setting unit 52 in the step S47. The second light emitting unit 50 then assumes the second state, and the light is stopped by the second light emitting unit 50 to be emitted in the step S48. The drive control unit 53 then assumes the first operation state in the step S37.

While there has been described in the forgoing embodiment about the fact that the first and second light emitting units 49 and 50 having a light-emit diode, the first and second light emitting units 49 and 50 may have other objects emitting light.

As will be seen from the above description, the second preferred embodiment of the surveillance camera apparatus according to the present invention can take advantage the non-surveillance area to ensure the operation to check whether or not the camera unit is normally operated in diverse ways, while the camera unit is moved in the surveillance area to perform a surveillance operation.

Figure 8:
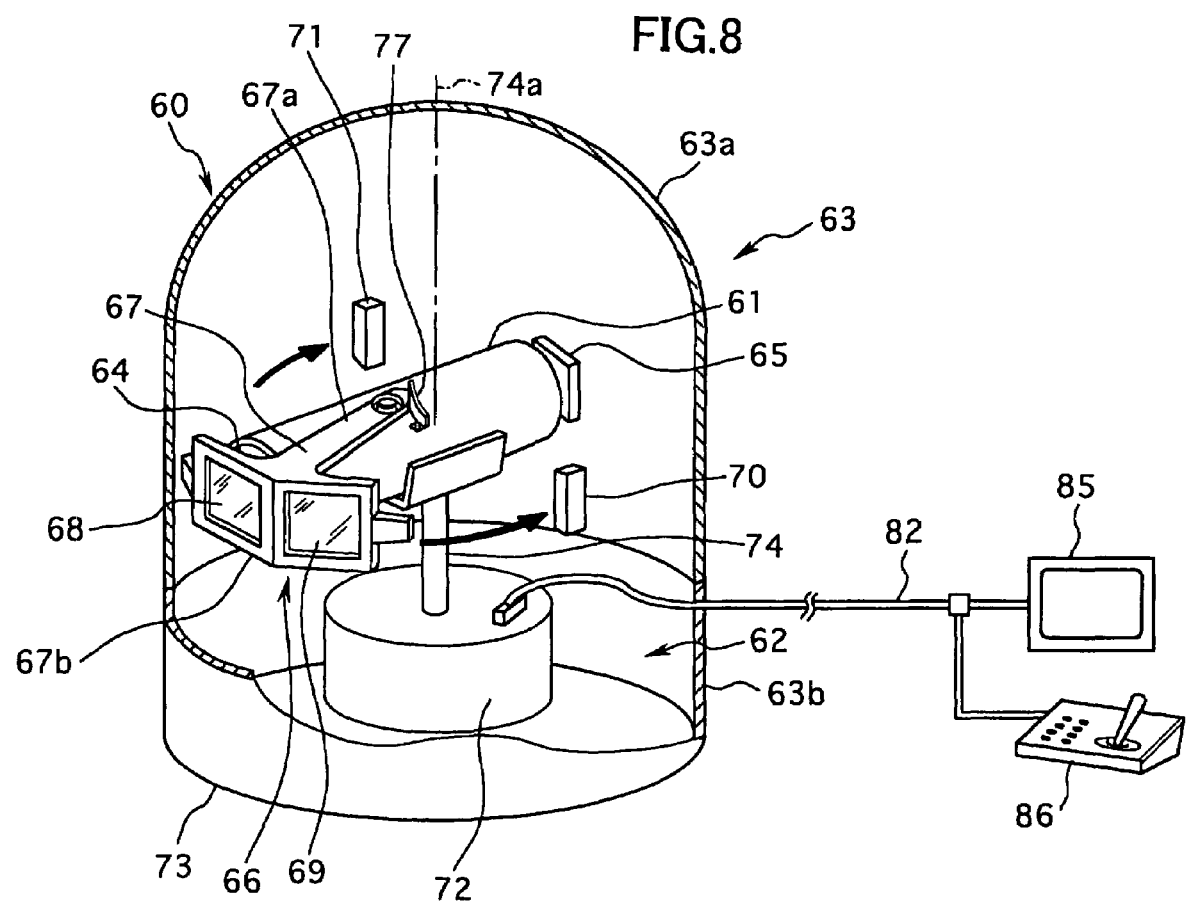
FIG. 8 is a perspective view of a third preferred embodiment of the surveillance camera apparatus according to the present invention and showing a dome cover partly fragmentary.
Figure 10:
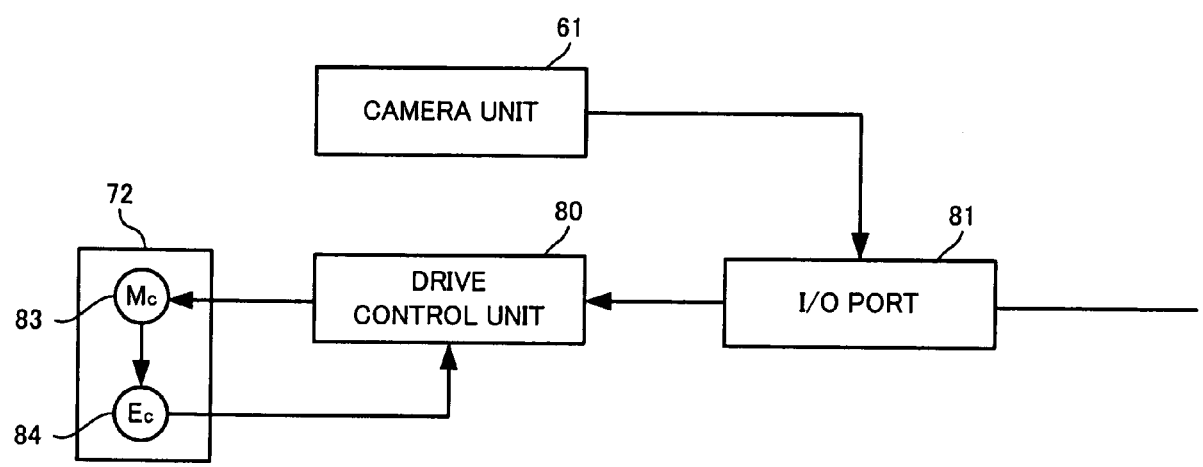
FIG. 10 is a block diagram of the surveillance camera apparatus according to the present invention shown in FIG. 8.

Referring now to the drawings, in particular to FIGS. 8 to 10, there is shown a third preferred embodiment of the surveillance camera apparatus according to the present invention. Throughout the following detailed description, similar reference numbers refer to respective similar elements or parts in all figures of the drawings.

The third preferred embodiment of the surveillance camera apparatus is shown in FIGS. 8 to 10 as having a reference number 60, and comprises a camera unit 61 for taking an image of a specific object, a camera retaining assembly 62 for retaining the camera unit 61, and a dome cover 63 mounted on the camera retaining assembly 62 to cover the camera unit 61.

The camera unit 61 is operative to produce an image signal indicative of the image taken by the camera unit 61, and includes a lens 64 having a light axis and capable of passing therethrough light forming the image taken by the camera unit 61, and a charge coupled device unit 65 having a plurality of charge coupled devices to translate the light passed through the lens 64 to the image signal. The camera unit 61 is constituted by a cylindrical body having the lens 64 accommodated therein.

The camera retaining assembly 62 includes a stationary member 73, and a camera shaft 74 revolvably supported on the stationary member 73 and having a camera revolution axis 74*a* around which the camera shaft 74 is revolvable with respect to the stationary member 73. The camera shaft 74 is driven in unison with the camera unit 61 by a camera driving unit 72 to have the camera unit 61 revolvably moved around the camera revolution axis with respect to the stationary member 73. The camera driving unit 72 will be described hereinafter in detail.

The surveillance camera apparatus 60 further comprises a light filtering unit 66 for filtering light forming image taken by the camera unit 61. The light filtering unit 66 has a filter frame 67 supported by the camera unit 61, and an optical filter 68 fixed with the filter frame 67 to cut part of light. In this embodiment, two optical filter windows are shown in FIG. 8 and appear to have respective optical filters supported therein, however, one of the optical filter windows has an optical filter 68 to cut part of light with the other optical filter window being empty and thus having no optical filer supported therein.

The filter frame 67 of the light filtering unit 66 is positioned on the camera unit 61 and includes an arm frame portion 67*a* having a front end, an intermediate portion, and a rear end, and a finger frame portion 67*b* integrally formed with to extend downwardly of the front end of the arm frame portion 67*a* to be capable of having the optical filter 68 of the light filtering unit 66 cover the lens 64 of the camera unit 61, the intermediate portion having received therein a pivotal pin 78 with a center axis 78*a* around which the arm frame portion 67*a* is pivotable with respect to the cylindrical body of the camera unit 61, and the rear end having a center ridge 67c. The intermediate portion has two cut faces 67d and 67e separated from each other at the center ridge 67c.

The filter frame 67 is movable with respect to the camera unit 61 to assume two different operation positions consisting of a first operation position where the optical filter 68 covers the lens 64 of the camera unit 61 to allow the camera unit 61 to be able to take the image with the optical filter 68, and a second operation position where the optical filter 68 uncovers the lens 64 of the camera unit 61 to allow the camera unit 61 to be able to take the image without the optical filter 68.

The surveillance camera apparatus 60 further comprises frame stop means 70 and 71 fixedly mounted on the dome cover 63 and thus held stationary with respect to the camera retaining assembly 62 to stop the filter frame 67 of the light filtering unit 66 from moving with respect to the camera retaining assembly 62 beyond a predetermined range.

The surveillance camera apparatus 60 further comprises a camera driving unit 72 supported on the stationary member 73 to drive the camera unit 61 to have the camera unit 61 moved with respect to the camera retaining assembly 62 in two different areas consisting of a surveillance area where the camera unit 61 is capable of taking the image of the specific object to perform a surveillance operation, and a non-surveillance area where the camera unit 61 is incapable of taking the image of the specific object to perform no surveillance operation, and where the filter frame 67 of the light filtering unit 66 is capable of selectively assuming the two different operation positions including a first position where the light passing through the optical filter 68 is partly cut off by the optical filter 68 and a second position where the light passing through the optical filter 68 is completely cut off by the optical filter 68. The camera driving unit 72 is adapted to drive the camera unit 61 to have the camera unit 61 moved with respect to the camera retaining assembly 62 to have the filter frame 67 of the light filtering unit 66 move into and out of engagement with the frame stop means 70 and 71.

The camera driving unit 72 includes a camera electric motor 83 (see FIG. 10) for transmitting revolution torques to the camera shaft 74 to have the camera unit 61 revolve around the camera revolution axis 74a with respect to the stationary member 73 of the camera retaining assembly 62, and a camera encoder 84 (see FIG. 10) for counting and encoding the revolution number of the camera electric motor 83. It is preferable that the camera electric motor 83 and the camera encoder 84 be combined to be constituted by a step-motor.

The dome cover 63 includes a dome portion 63a partly in the form of a spherical shape and made of a transparent material, and a cylindrical portion 63b integrally formed with the dome portion 63a and made of a transparent material or a non-transparent material.

The surveillance camera apparatus 60 further comprises a drive control unit 80 for controlling the camera driving unit 72 to have the camera driving unit 72 drive the camera unit 61 to have the camera unit 61 moved with respect to the camera retaining assembly 62 in the two different areas. The drive control unit 80 is operative to assume two different operation states consisting of a first operation state under which the camera unit 61 is driven by the camera driving unit 72 to be moved within the surveillance area, and a second operation state under which the camera unit 61 is driven by the camera driving unit 72 to be moved with respect to the camera retaining assembly 62 to have the filter frame 67 of the light filtering unit 66 move into and out of engagement with the frame stop means 70 and 71, and which the filter frame 67 of the light filtering unit 66 is moved with respect to the camera retaining assembly 62 to allow the filter frame 67 of the light filtering unit 66 to selectively assume the two different operation positions under the state that the filter frame 67 of the light filtering unit 66 is in engagement with the frame stop means 70 and 71.

The surveillance camera apparatus 60 further comprises a pair of regulating members 75 and 76 fixedly mounted on the cylindrical body of the camera unit 61 and angularly spaced apart from each other to have the arm frame portion 67a of the filter frame 67 disposed therebetween. The regulating members 75 and 76 have respective inner faces opposing to each other and radially extending to regulate the motion of the filter frame 67.

The surveillance camera apparatus 60 further comprises a resilient member 77 is constituted by a plate spring, and fixedly mounted on the cylindrical body of the camera unit 61 to be contactable with the cut faces 67d and 67e of the rear end of the arm frame portion 67a of the filter frame 67 to resiliently urge the arm frame portion 67a of the filter frame 67 to regulate the movement of the filter frame 67. The resilient member 77 has a resilient force so selected that the filter frame 67 is movable with respect to the camera unit 61 under the state that the filter frame 67 of the light filtering unit 66 is in engagement with the frame stop means 70 and 71, and that the filter frame 67 is unmovable with respect to the camera unit 61 under the state that the filter frame 67 of the light filtering unit 66 is out of engagement with the frame stop means 70 and 71. This mean that the filter frame 67 is moved with respect to the camera unit 61 against the resilient force of the resilient member 77 due to the movement force of the camera unit 61 larger than the resilient force of the resilient member 77. It will thus be understood that the movement of the filter frame 67 with respect to the camera unit 61 causes the different filters to be selected as needed by the operators.

The surveillance camera apparatus 60 further comprises an I/O port 81 securely mounted on the camera driving unit 72 of the camera retaining assembly 62, and electrically connected through an electric line 82 to an exterior apparatus having a monitor unit 85 and a controller 86. The I/O port 81 is designed to output the image signal produced by the camera unit 61 to the monitor unit 85 to have the monitor unit 85 display and record the image represented by the image signal. The I/O port 81 is adapted to input from the controller 86 a position signal for changing the position and posture of the camera unit 61, and first and second operation signals for respectively setting the drive control unit 80 to assume the first and second operation states.

In above embodiment, there has been described about the fact that one of the optical filter windows has an optical filter 68 to cut part of light with the other optical filter window being empty and thus having no optical filer supported therein, however, the other optical filter window may have an optical filter 69 to cut infrared light according to the present invention. It will thus be understood that the light filtering unit 66 may have a filter frame 67 supported by the camera unit 61, and a plurality of optical filters 68 and 69 fixed with the filter frame 67 and designed to cut part of light at different cut rates according to the present invention. The optical filters 68 and 69 may be made of different types such as for example an ordinary light filter and an infrared light filter according to the present invention.

The following description will be directed to how the surveillance camera apparatus 60 according to the present invention is operated.

The filter frame 67 is firstly moved with respect to the camera unit 61 to assume a plurality of operation positions where each of the optical filters 68 and 69 covers the lens 64 of the camera unit 61 to allow the camera unit 61 to be able to take the image with each of the optical filters 68 and 69. The drive control unit 80 is then operated to assume two different operation states consisting of a first operation state under which the camera unit 61 is driven by the camera driving unit 72 to be moved within the surveillance area, and a second operation state under which the camera unit 61 is driven by the camera driving unit 72 to be moved with respect to the camera retaining assembly 62 to have the filter frame 67 of the light filtering unit 66 moved into and out of engagement with the frame stop means 70 and 71, and which the filter frame 67 of the light filtering unit 66 is moved with respect to the camera retaining assembly 62 to allow the filter frame 67 of the light filtering unit 66 to selectively assume the different operation positions under the state that the filter frame 67 of the light filtering unit 66 is in engagement with the frame stop means 70 and 71.

Figure 11:
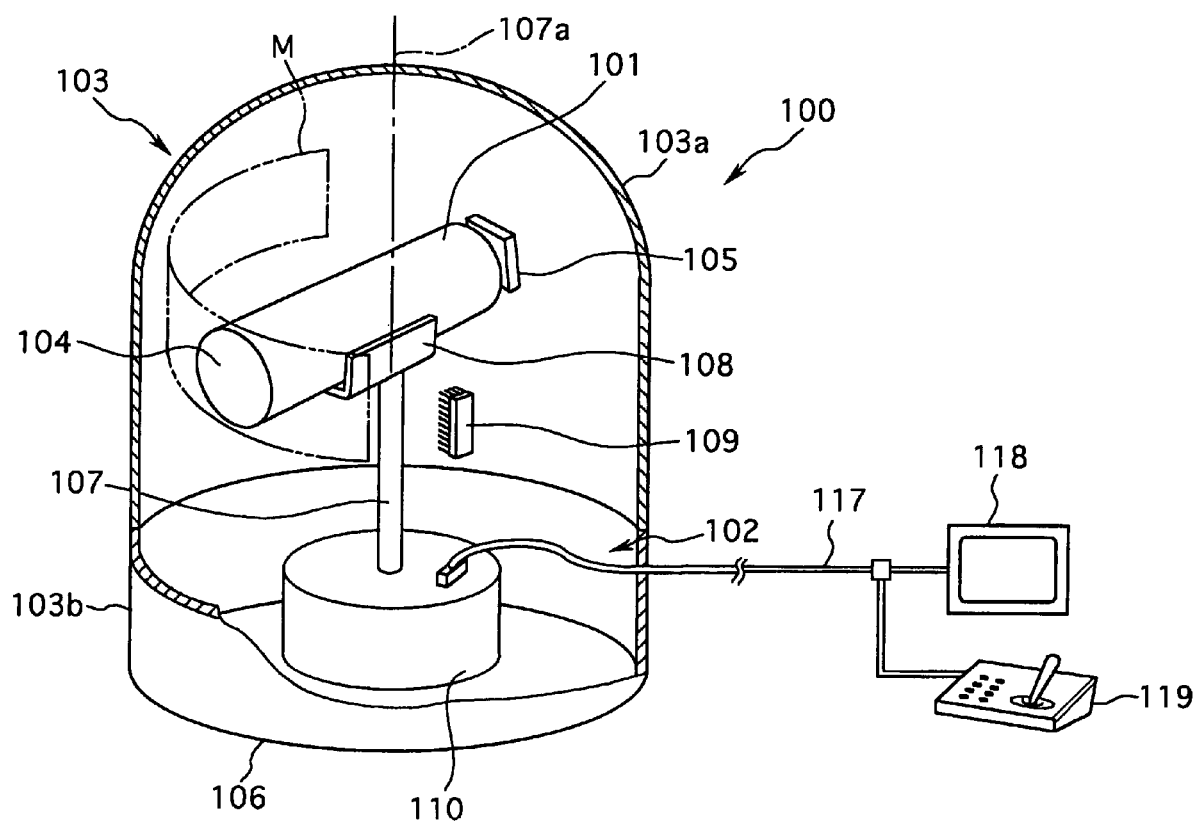
FIG. 11 is a perspective view of a fourth preferred embodiment of the surveillance camera apparatus according to the present invention and showing a dome cover partly fragmentary.
Figure 12:
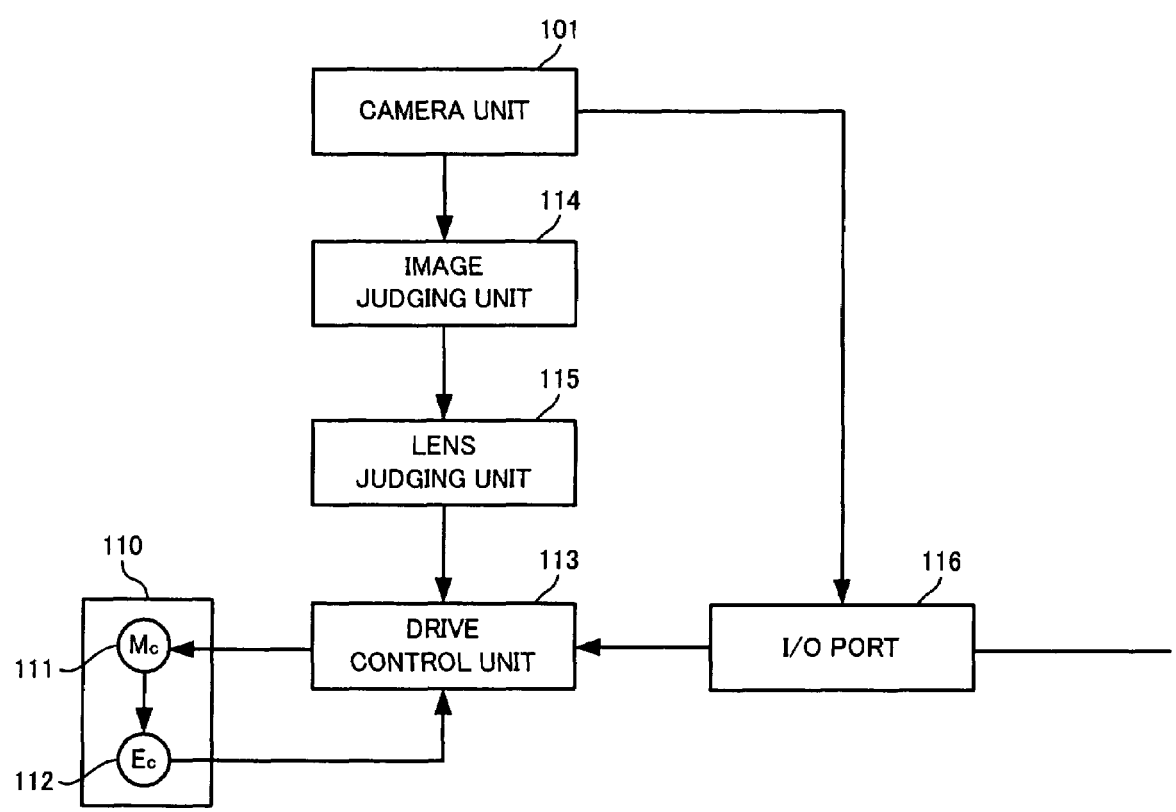
FIG. 12 is a block diagram of the surveillance camera apparatus according to the present invention shown in FIG. 11.
Figure 13:
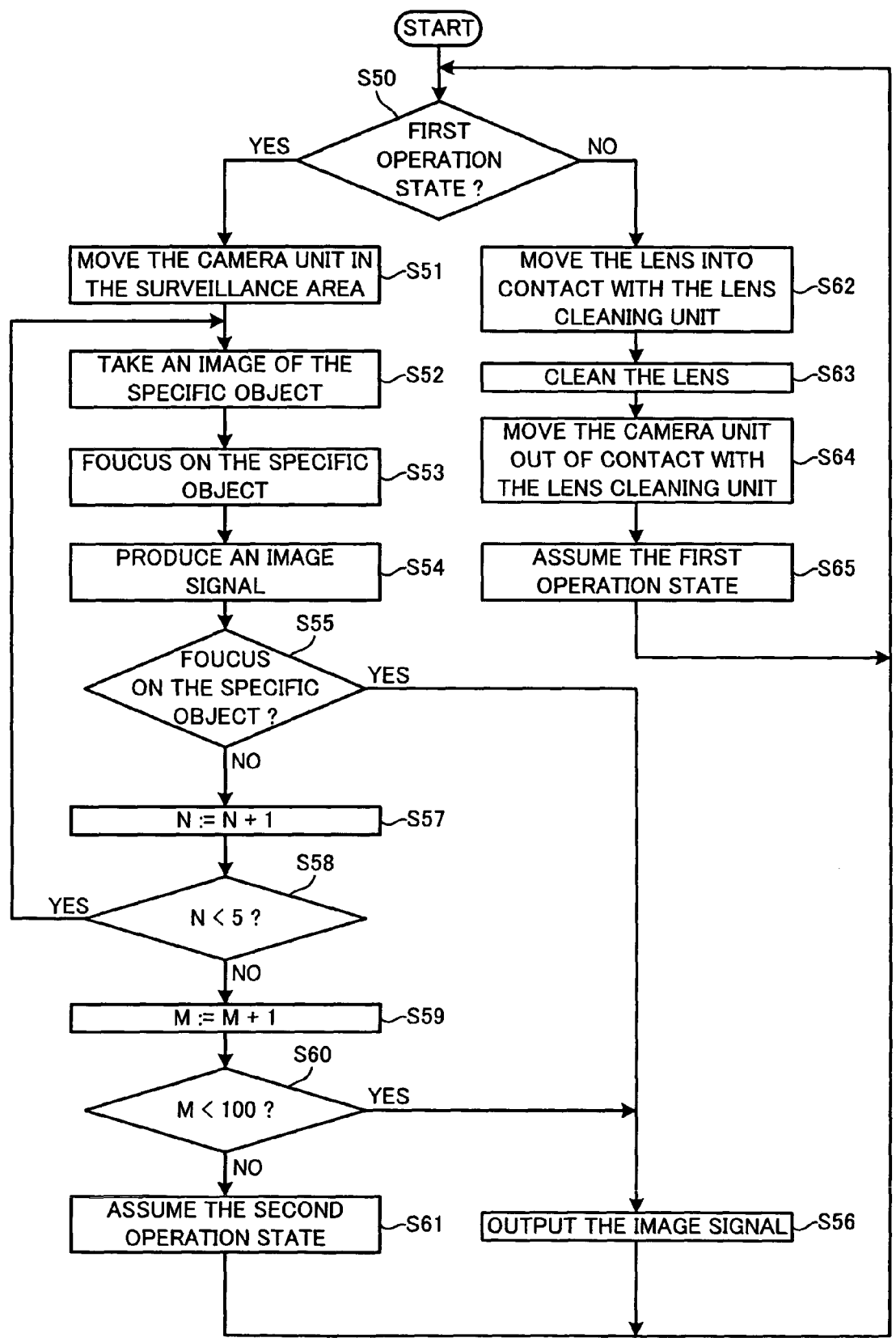
FIG. 13 is a flow chart of the surveillance camera apparatus according to the present invention shown in FIG. 11.

Referring now to the drawings, in particular to FIGS. 11 to 13, there is shown a fourth preferred embodiment of the surveillance camera apparatus according to the present invention. Throughout the following detailed description, similar reference numbers refer to respective similar elements or parts in all figures of the drawings.

The fourth preferred embodiment of the surveillance camera apparatus is shown in FIGS. 11 and 12 as having a reference number 100, and comprises a camera unit 101 for taking an image of a specific object, a camera retaining assembly 102 for retaining the camera unit 101, and a dome cover 103 mounted on the camera retaining assembly 102 to cover the camera unit 101. The camera unit 101 is operative to produce an image signal indicative of the image taken by the camera unit 101, and includes a lens 104 having a light axis and capable of passing therethrough light forming the image taken by the camera unit 101, and a charge coupled device unit 105 having a plurality of charge coupled devices to translate the light passed through the lens 104 to the image signal.

The camera retaining assembly 102 includes a stationary member 106 secured to a fixed structure such as for example a ceiling wall forming part of a building, and a side wall forming part of an elevator cage, a camera shaft 107 revolvably supported on the stationary member 106 and having a camera revolution axis 107a around which the camera shaft 107 is revolvable with respect to the stationary member 106, and a channel member 108 securely mounted on the camera shaft 107 to hold the camera unit 101. The camera shaft 107 has a fixed end portion revolvably connected to the stationary member 106 and a free end portion extending from the stationary member 106 to securely support the channel member 108 to ensure that the camera unit 101 is revolvable with respect to the stationary member 106 around the camera revolution axis 107a.

The dome cover 103 includes a dome portion 103a partly in the form of a spherical shape and made of a transparent material, and a cylindrical portion 103b integrally formed with the dome portion 103a and made of a transparent material or a non-transparent material.

The surveillance camera apparatus 100 further comprises a lens cleaning unit 109 constituted by a brush, and fixedly held on the inner surface of the dome portion 103a of the dome cover 103 stationary with respect to the camera retaining assembly 102 to clean the lens 104 of the camera unit 101.

The surveillance camera apparatus 100 further comprises a camera driving unit 110 securely supported on the stationary member 106 of the camera retaining assembly 102 to drive the camera unit 101 to have the camera unit 101 revolvably moved around the camera revolution axis 107a with respect to the stationary member 106 of the camera retaining assembly 102 in two different areas consisting of a surveillance area where the camera unit 101 is capable of taking the image of the specific object to perform a surveillance operation, and a non-surveillance area where the camera unit 101 is incapable of taking the image of the specific object to perform no surveillance operation, and where the lens 104 of the camera unit 101 is capable of cleaned by the lens cleaning unit 109. In this embodiment shown in FIG. 12, the term "surveillance area" is intended to indicate an area "M" to perform a surveillance operation by allowing the outside light to pass therethrough to the lens 104 of the camera unit 101, while the term "non-surveillance area" is intended to indicate an area excluding the area "M" to perform a non-surveillance operation by allowing the outside light not to pass therethrough to the lens 104 of the camera unit 101.

The camera driving unit 110 includes a camera electric motor 111 (see FIG. 12) for transmitting revolution torques to the camera shaft 107 to have the camera unit 101 revolve around the camera revolution axis 107a with respect to the stationary member 106 of the camera retaining assembly 102, and a camera encoder 112 (see FIG. 12) for counting and encoding the revolution number of the camera electric motor 111. It is preferable that the camera electric motor 111 and the camera encoder 112 be combined to be constituted by a step-motor. The camera driving unit 110 is adapted to drive the camera unit 101 to have the camera unit 101 moved with respect to the stationary member 106 of the camera retaining assembly 102 to have the lens 104 of the camera unit 101 slidably move into and out of contact with the lens cleaning unit 109.

The surveillance camera apparatus 100 further comprises a drive control unit 113 (see FIG. 12) securely mounted on the camera retaining assembly 102 to control the camera driving unit 110 to have the camera driving unit 110 drive the camera unit 101 to have the camera unit 101 moved with respect to the stationary member 106 of the camera retaining assembly 102 in the two different areas.

The drive control unit 113 is operative to assume two different operation states consisting of a first operation state under which the camera unit 101 is driven by the camera driving unit 110 to be moved within the surveillance area, and a second operation state under which the camera unit 101 is driven by the camera driving unit 110 to be moved with respect to the stationary member 106 of the camera retaining assembly 102 to have the lens 104 of the camera unit 101 slidably moved into contact with the lens cleaning unit 109 in said non-surveillance area to allow the lens cleaning unit 109 to clean the lens 104 of the camera unit 101, and which said camera unit 101 is driven by the camera driving unit 110 to be moved with respect to the camera retaining assembly 102 to have the lens 104 of the camera unit 101 moved out of contact with the lens cleaning unit 109.

The camera unit 101 is adapted to focus on the specific object of which the image taken by the camera unit 101. The surveillance camera apparatus 100 further comprises an image judging unit 114 securely mounted on the camera retaining assembly 102 to judge whether or not the image taken by the camera unit 101 is in focus on the specific object based on the image signal produced by the camera unit 101, and a lens judging unit 115 securely mounted on the camera retaining assembly 102 to judge whether or not the lens 104 of the camera unit 101 is dirty based on based on results judged by the image judging unit 114. The drive control unit 113 is operative to assume each of the two different operation states in accordance with results judged by the lens judging unit 115.

The surveillance camera apparatus 100 further comprises an I/O port 116 (see FIG. 12) securely mounted on the camera retaining assembly 102, and electrically connected through an electric line 117 to an exterior apparatus having a monitor unit 118 and a controller 119. The I/O port 116 is designed to output the image signal produced by the camera unit 101 to the monitor unit 118 to have the monitor unit 118 display and record the image represented by the image signal. The I/O port 116 is adapted to input from the controller 119 a position signal for changing the position and posture of the camera unit 101, and first and second operation signals for respectively setting the drive control unit 113 to assume the first and second operation states.

The operation of the surveillance camera apparatus 100 will be described in detail hereinafter with reference to FIG. 13.

Under the condition that the drive control unit 113 assumes the first operation state in the step S50, the camera unit 101 is driven by the camera driving unit 110 to be moved in the surveillance area with respect to the stationary member 106 of the camera retaining assembly 102 when the position signal is inputted from the controller 119 through the I/O port 116 to the drive control unit 113 in the step S51.

The specific object of which the image taken by the camera unit 101 is then focused by the camera unit 101 in the step S52, and the image of the specific object is then taken by the camera unit 101 in the step S53. The image signal is then produced by the camera unit 101 in the step S54. The judgment is then made by the image judging unit 114 on whether or not the image taken by the camera unit 101 is in focus on the specific object based on the image signal produced by the camera unit 101 in the step S55.

When the answer in the step S55 is in the affirmative "Yes", i.e., the image taken by the camera unit 101 is in focus on the specific object, the step S55 proceeds to the step S56. The image signal produced by the camera unit 101 is then outputted through the I/O port 116 to the monitor unit 118 for displaying and recording the image in the step S56.

When, on the other hand, the answer in the step S55 is in the negative "No", i.e., the image taken by the camera unit 101 is out of focus on the specific object, the step S55 proceeds to the step S57. The number of the judgment made by the image judging unit 114 in the step S55 is memorized to the image judging unit 114 in the step S57. In FIG. 13, the number of the judgment made by the image judging unit 114 in the step S55 is represented by the reference character "N". The judgment is then made by the image judging unit 114 on whether or not the number of the judgment made by the image judging unit 114 in the step S55 is lower than a predetermined number, for example 5, in the step S58.

When the answer in the step S58 is in the affirmative "Yes", i.e., the number of the judgment made by the image judging unit 114 in the step S55 is lower than the predetermined number, the step S58 proceeds to the step S52. When, on the other hand, the answer in the step S58 is in the negative "No", i.e., the number of the judgment made by the image judging unit 114 in the step S55 is no lower than the predetermined number, the step S58 proceeds to the step S59. The number of the judgment made by the image judging unit 114 in the step S58 is memorized to the image judging unit 114 in the step S59. In FIG. 13, the number of the judgment made by the image judging unit 114 in the step S59 is represented by the reference character "M".

The judgment is then made by the lens judging unit 115 on whether or not the number of the judgment made by the image judging unit 114 in the step S58 is lower than a predetermined number, for example 100, in the step S60. When the answer in the step S60 is in the affirmative "Yes", i.e., the number of the judgment made by the image judging unit 114 in the step S58 is lower than the predetermined number, the step S60 proceeds to the step S58. When, on the other hand, the answer in the step S60 is in the negative "No", i.e., the number of the judgment made by the image judging unit 114 in the step S58 is no lower than the predetermined number, the step S60 proceeds to the step S61. The drive control unit 113 assumes the second operation state in the step S61. The drive control unit 113 otherwise assumes the second operation state, when the second operation signal is inputted through the I/O port 116 to the drive control unit 113.

Under the condition that the drive control unit 113 assumes the second operation state in the step S50, the camera unit 101 is driven by the camera driving unit 110 to be moved with respect to the stationary member 106 of the camera retaining assembly 102 to have the lens 104 of the camera unit 101 slidably moved into contact with the lens cleaning unit 109 in said non-surveillance in the step S62. The lens 104 of the camera unit 101 is then cleaned by the lens cleaning unit 109 in the step S63. The camera unit 101 is then driven by the camera driving unit 110 to be moved with respect to the stationary member 106 of the camera retaining assembly 102 to have the lens 104 of the camera unit 101 moved out of contact with the lens cleaning unit 109 in the step S64. The drive control unit 113 then assumes the first operation state in the step S65.

While there has been described in the forgoing embodiment about the fact that the camera unit 101 is move revolvably around the camera revolution axis 107a of the camera shaft 107 with respect to the stationary member 106, the camera unit 101 may be revolvably moved around a tilt axis in perpendicular relationship with the camera revolution axis 107a of the camera shaft 107 with respect to the stationary member 106, or may be revolvably moved around the camera revolution axis 107a of the camera shaft 107 and the tilt axis with respect to the stationary member 106.

The previous surveillance camera apparatus 100 may have another brush fixedly connected to the camera unit 101 on the opposite side of the lens 104 to clean the inner surface of the dome portion 103a of the dome cover 103.

As will be seen from the above description, the fourth preferred embodiment of the surveillance camera apparatus according to the present invention can take advantage the non-surveillance area to ensure the operation to clean the lens of the camera unit, while the camera unit is moved in the surveillance area to perform a surveillance operation.

Referring now to the drawings, in particular to FIGS. 14 to 17, there is shown a fifth preferred embodiment of the surveillance camera apparatus according to the present invention. Throughout the following detailed description, similar reference numbers refer to respective similar elements or parts in all figures of the drawings.

Figure 14:
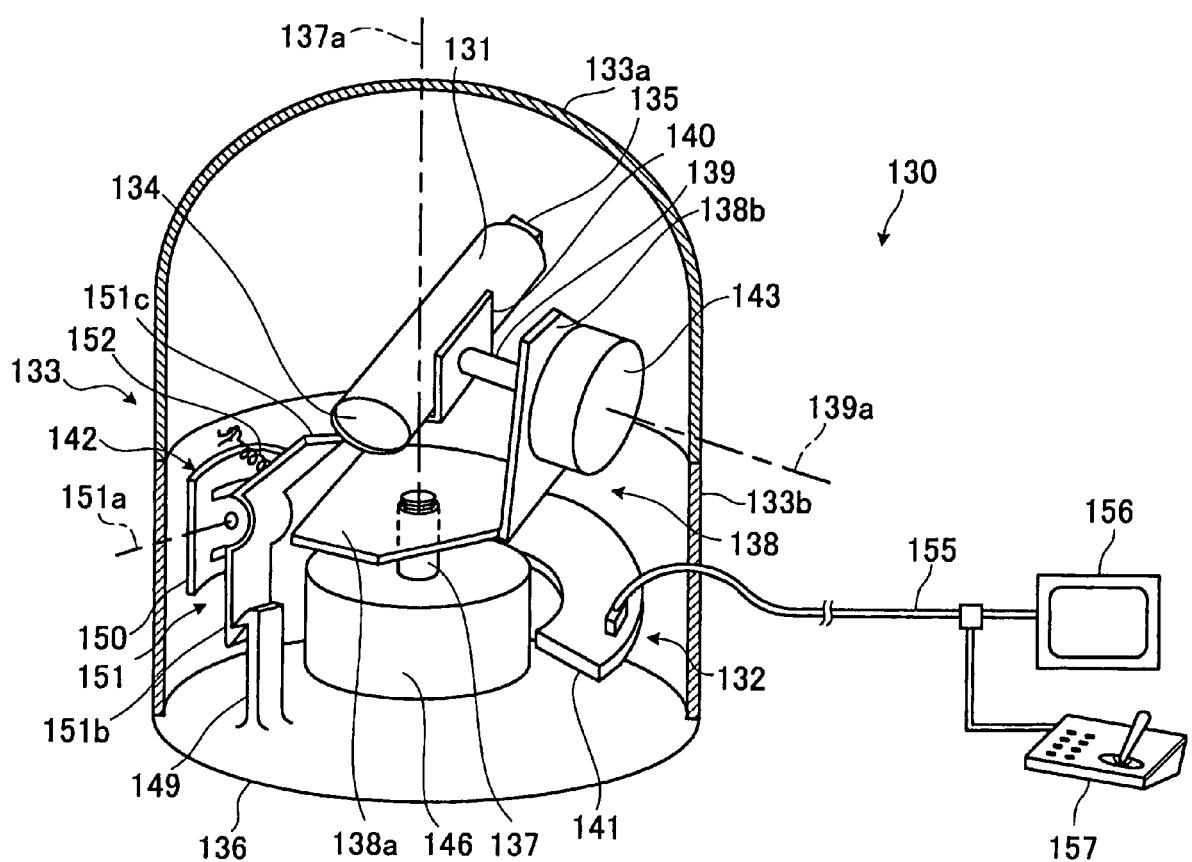
FIG. 14 is a perspective view of a fifth preferred embodiment of the surveillance camera apparatus according to the present invention and showing a dome cover partly fragmentary.
Figure 17:
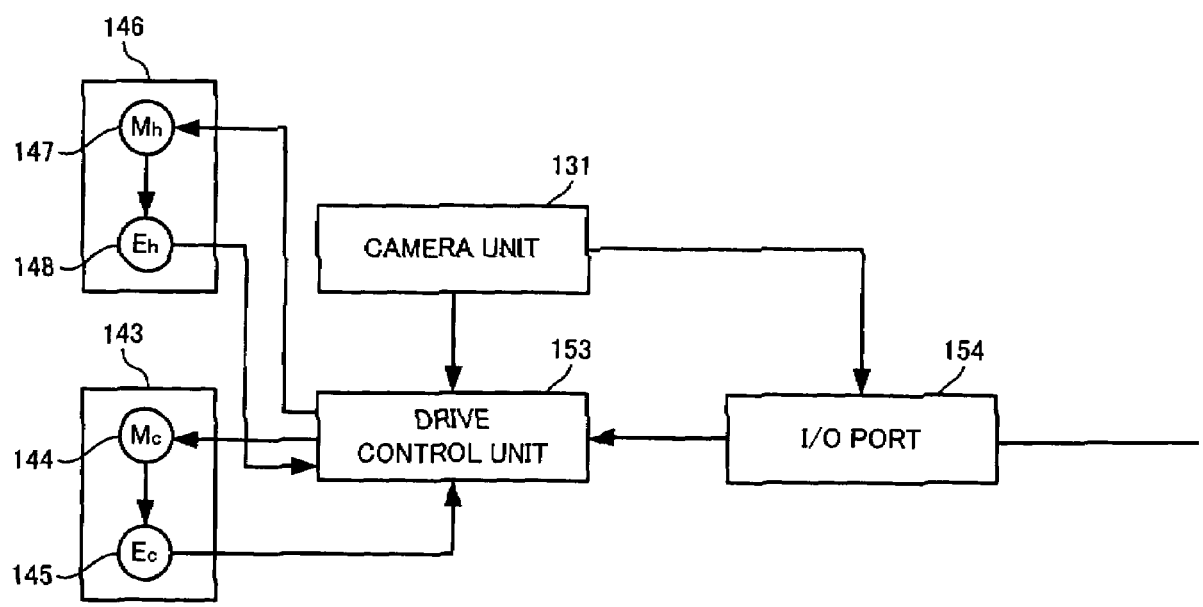
FIG. 17 is a block diagram of the surveillance camera apparatus according to the present invention shown in FIG. 14.

The fifth preferred embodiment of the surveillance camera apparatus is shown in FIGS. 14 and 17 as having a reference number 130, and comprises a camera unit 131 for taking an image of a specific object, a camera retaining assembly 132 for retaining the camera unit 131, and a dome cover 133 mounted on the camera retaining assembly 132 to cover the camera unit 131. The camera unit 131 is operative to produce an image signal indicative of the image taken by the camera unit 131, and includes a lens 134 having a light axis and capable of passing therethrough light forming the image taken by the camera unit 131, a charge coupled device unit 135 having a plurality of charge coupled devices to translate the light passed through the lens 134 to the image signal, and a cylindrical body having the lens 134 accommodated therein.

The camera retaining assembly 132 includes a stationary member 136 secured to a fixed structure such as for example a ceiling wall forming part of a building, and a side wall forming part of an elevator cage, a holder shaft 137 revolvably supported on the stationary member 136 and having a holder revolution axis 137a around which the holder shaft 137 is revolvable with respect to the stationary member 136, a holder member 138 fixedly mounted on the holder shaft 137, a camera shaft 139 revolvably supported on the holder member 138 and having a camera revolution axis 139a in perpendicular relationship with the holder revolution axis 137a of the holder shaft 137 and around which the camera shaft 139 is revolvable with respect to the holder member 138, and a channel member 140 securely mounted on the camera shaft 139 to hold the camera unit 131.

The holder shaft 137 has a first end portion revolvably connected to the stationary member 136, and a second end portion securely connected to the holder member 138 to ensure that the holder member 138 is revolvable with respect to the stationary member 136 around the holder revolution axis 137a. The camera shaft 139 has a fixed end portion revolvably connected to the holder member 138 and a free end portion extending from the holder member 138 to securely support the channel member 140 to ensure that the camera unit 131 is revolvable with respect to the holder member 138 around the camera revolution axis 139a. The holder member 138 is in the form of L-shape in cross-section and has a first plate portion 138a having an outer surface paralleled to that of the stationary member 136, and a second plate portion 138b integrally formed with the first plate portion 138a to have an outer surface perpendicular to that of the first plate portion 138a. The camera retaining assembly 132 further comprises a support plate 141 securely supported on first plate portion 138a of the holder member 138 to be revolvable together with the holder member 138.

The dome cover 133 includes a dome portion 133a partly in the form of a spherical shape and made of a transparent material, and a cylindrical portion 133b integrally formed with the dome portion 133a and made of a transparent material or a non-transparent material.

The surveillance camera apparatus 130 further comprises coupling means 142 for coupling the cylindrical portion 133b of the dome cover 133 with the stationary member 136 of the camera retaining assembly 132. It is impossible to decouple the dome cover 133 from the stationary member 136 while the coupling means 142 couples the cylindrical portion 133b of the dome cover 133 with the stationary member 136 of the camera retaining assembly 132.

The surveillance camera apparatus 130 further comprises a camera driving unit 143 securely supported on the holder member 138 of the camera retaining assembly 132 to drive the camera unit 131 to have the camera unit 131 revolvably moved around the camera revolution axis 139a with respect to the holder member 138 of the camera retaining assembly 132 in two different areas consisting of a surveillance area where the camera unit 131 is capable of taking the image of the specific object, and a non-surveillance area where the camera unit 131 is incapable of taking the image of the specific object to perform no surveillance operation. The camera driving unit 143 includes a camera electric motor 144 (see FIG. 17) for transmitting revolution torques to the camera shaft 139 to have the camera unit 131 revolve around the camera revolution axis 139a with respect to the holder member 138 of the camera retaining assembly 132, and a camera encoder 145 (see FIG. 17) for counting and encoding the revolution number of the camera electric motor 144. It is preferable that the camera electric motor 144 and the camera encoder 145 be combined to be constituted by a step-motor.

The surveillance camera apparatus 130 further comprises a holder driving unit 146 securely supported on the stationary member 136 of the camera retaining assembly 132 to drive the holder member 138 of the camera retaining assembly 132 to have the holder member 138 of the camera retaining assembly 132 revolvably moved with respect to the stationary member 136 of the camera retaining assembly 132 in the two different areas. The holder driving unit 146 includes a holder electric motor 147 (see FIG. 17) for transmitting revolution torques to the holder shaft 137 to have the holder member 138 of the camera retaining assembly 132 revolve around the holder revolution axis 137a with respect to the stationary member 136 of the camera retaining assembly 132, and a holder encoder 148 (see FIG. 17) for counting and encoding the revolution number of the holder electric motor 147. It is preferable that the holder electric motor 147 and the holder encoder 148 be combined to be constituted by a step-motor.

The coupling means 142 is operated to have the cylindrical portion 133b of the dome cover 133 disengaged out of the stationary member 136 of the camera retaining assembly 132 when the camera driving unit 143 is operative to drive the camera unit 131 with the holder member 138 of the camera retaining assembly 132 being driven by the holder driving unit 146 to have the camera unit 131 moved with respect to the stationary member 136 of the camera retaining assembly 132 to have the camera unit 131 move into engagement with the coupling means 142 in the non-surveillance area.

The coupling means 142 includes a fixed hook member 149 fixedly mounted on the stationary member 136 of the camera retaining assembly 132 in the dome cover 133, a bracket member 150 fixedly mounted on the cylindrical portion 133b of the dome cover 133 to extend inwardly from the inner surface of the cylindrical portion 133b of the dome cover 133 toward the fixed hook member 149, and a pivotal member 151 supported on the bracket member 150 and having a center axis 151a. The pivotal member 151 has a locking portion 151b extending toward the fixed hook member 149 to be engageable with the fixed hook member 149, and an unlocking portion 151c extending toward the camera unit 131 and angularly spaced apart from the locking portion 151b. The pivotal member 151 is pivotable around the center axis 151a to assume a first angular position where the locking portion 151b is engaged with the fixed hook member 149, and a second angular position where the locking portion 151b is disengaged from the fixed hook member 149.

The coupling means 142 further includes a resilient member 152 for resiliently urge the pivotal member 151 toward the first angular position of the pivotal member 151 to have the locking portion 151b engaged with the fixed hook member 149. The resilient member 152 is constituted by a tensile coil spring having one end fixed to the cylindrical portion 133b of the dome cover 133 and the other end fixed to the unlocking portion 151c of the pivotal member 151 to resiliently urge the pivotal member 151 toward the first angular position.

The locking portion 151b of the pivotal member 151 is brought into engagement with the fixed hook member 149 when the dome cover 133 is mounted on the camera retaining assembly 132 to have the pivotal member 151 pivoted to the first angular position from the second angular position against the resilient force of the resilient member 152, and the locking portion 151b of the pivotal member 151 is brought out of engagement with the fixed hook member 149 when the camera unit 131 is engaged with the unlocking portion 151c to have the pivotal member 151 pivoted to the second angular position from the first angular position against the resilient force of the resilient member 152.

The camera unit 131 further includes an engagement projection 131a fixedly mounted on the cylindrical body and being held in face-to-face relationship with the unlocking portion 151c of the pivotal member 151 when the camera unit 131 is driven by the camera driving unit 143 to be moved with respect to the stationary member 136 of the camera retaining assembly 132 within the non-surveillance area. The engagement projection 131a is engaged with the unlocking portion 151c of the pivotal member 151 when the pivotal member 151 is pivoted to the second angular position from the first angular position against the resilient force of the resilient member 152.

The surveillance camera apparatus 130 further comprises a drive control unit 153 for controlling the camera driving unit 143 and holder driving unit 146 to have the camera unit 131 moved with respect to the stationary member 136 of the camera retaining assembly 132 between two different positions consisting of a first position where the camera unit 131 is held in engagement with the coupling means 142 to have the cylindrical portion 133b of the dome cover 133 disengaged out of the stationary member 136 of the camera retaining assembly 132, and a second position where the camera unit 131 is held out of engagement with the coupling means 142 to have the cylindrical portion 133b of the dome cover 133 engaged with the stationary member 136 of the camera retaining assembly 132.

The drive control unit 153 is operative to assume two different operation states consisting of a first operation state under which the camera unit 131 is moved within the surveillance area, and a second operation state under which the camera unit 131 is moved with respect to the stationary member 136 of the camera retaining assembly 132 to have the camera unit 131 move into engagement with the coupling means 142 within the non-surveillance area to allow the coupling means 142 to disengage the cylindrical portion 133b of the dome cover 133 out of the stationary member 136 of the camera retaining assembly 132.

Under the state that the drive control unit 153 assumes the second operation state, the camera unit 131 is moved with respect to the stationary member 136 of the camera retaining assembly 132 to have the camera unit 131 move out of engagement with the coupling means 142 to allow the coupling means 142 to engage the cylindrical portion 133b of the dome cover 133 with the stationary member 136 of the camera retaining assembly 132.

The surveillance camera apparatus 130 further comprises an I/O port 154 securely mounted on the support plate 141 of the camera retaining assembly 132, and electrically connected through an electric line 155 to an exterior apparatus having a monitor unit 156 and a controller 157. The I/O port 154 is designed to output the image signal produced by the camera unit 131 to the monitor unit 156 to have the monitor unit 156 display and record the image represented by the image signal. The I/O port 154 is adapted to input from the controller 157 a position signal for changing the position and posture of the camera unit 131, and first and second operation signals for respectively setting the drive control unit 153 to assume the first and second operation states.

The operation of the surveillance camera apparatus 130 will be described in detail hereinafter with reference to FIGS. 15 and 16.

Under the condition that the drive control unit 153 assumes the first operation state, the camera unit 131 is driven by the camera driving unit 143 while the holder member 138 of the camera retaining assembly 132 is driven by the holder driving unit 146 when the position signal inputted from the controller 157 through the I/O port 154 to the drive control unit 153. At this time, the camera unit 131 is moved in the surveillance area with respect to the stationary member 136 of the camera retaining assembly 132.

The image of the specific object is then taken by the camera unit 131, and the image signal is produced by the camera unit 13. The image signal produced by the camera unit 131 is then outputted through the I/O port 154 to the monitor unit 156 for displaying and recording the image.

Figure 15:
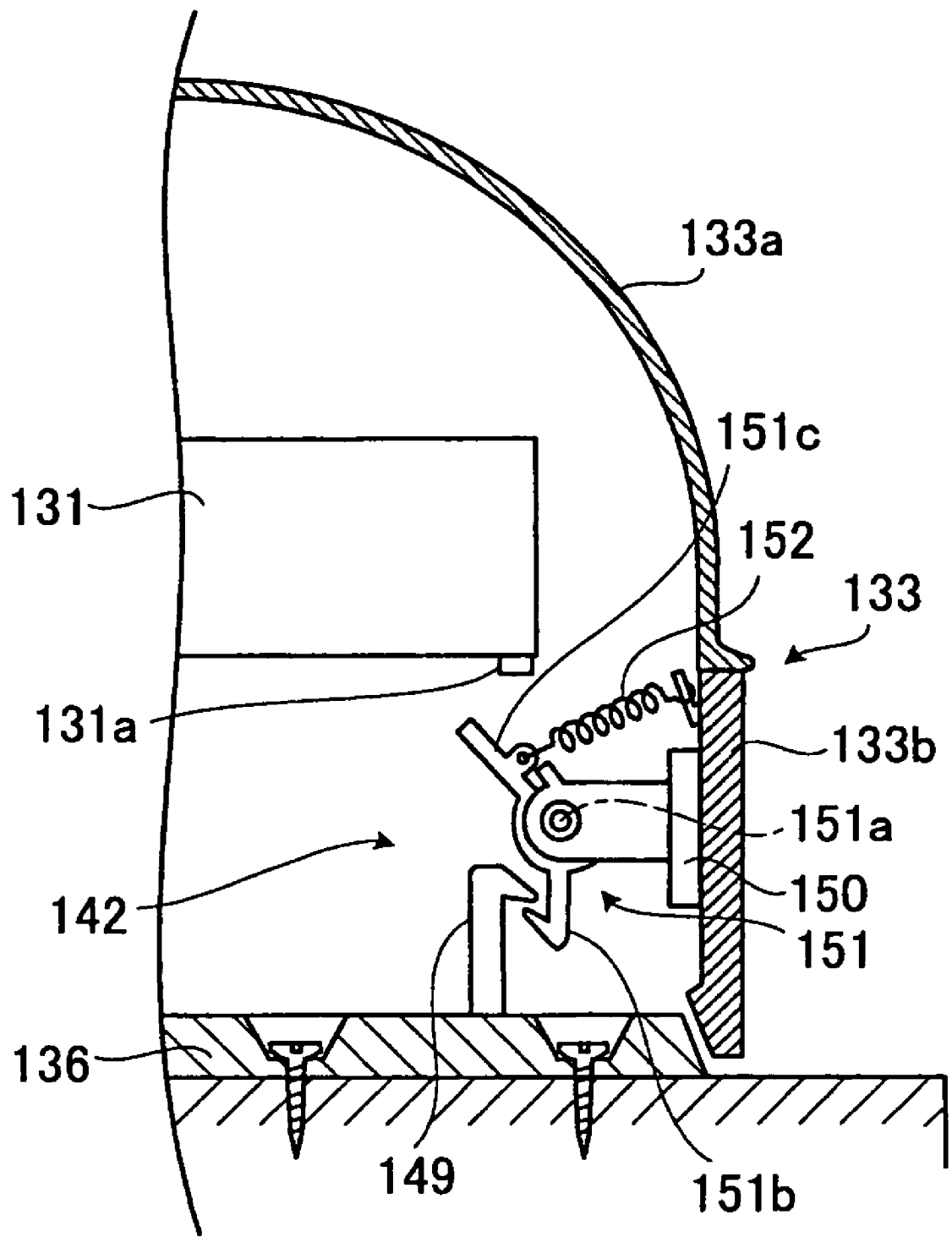
FIG. 15 is a fragmentary and enlarged cross-sectional view of coupling means forming part of the surveillance camera apparatus shown in FIG. 14 and showing a camera unit and the coupling means in engagement with each other.

While the camera unit 131 is moved in the surveillance area with respect to the stationary member 136 of the camera retaining assembly 132, the cylindrical portion 133b of the dome cover 133 is coupled by the coupling means 142 with the stationary member 136 of the camera retaining assembly 132 as best shown in FIG. 15.

When the second operation signal inputted through the I/O port 154 to the drive control unit 153, the drive control unit 153 assumes the second operation state. Under the condition that the drive control unit 153 assumes the second operation state, the camera unit 131 is driven by the camera driving unit 143 while the holder member 138 of the camera retaining assembly 132 is driven by the holder driving unit 146. At this time, the camera unit 131 is moved into engagement with the unlocking portion 151c of the pivotal member 151 of the coupling means 142.

Figure 16:
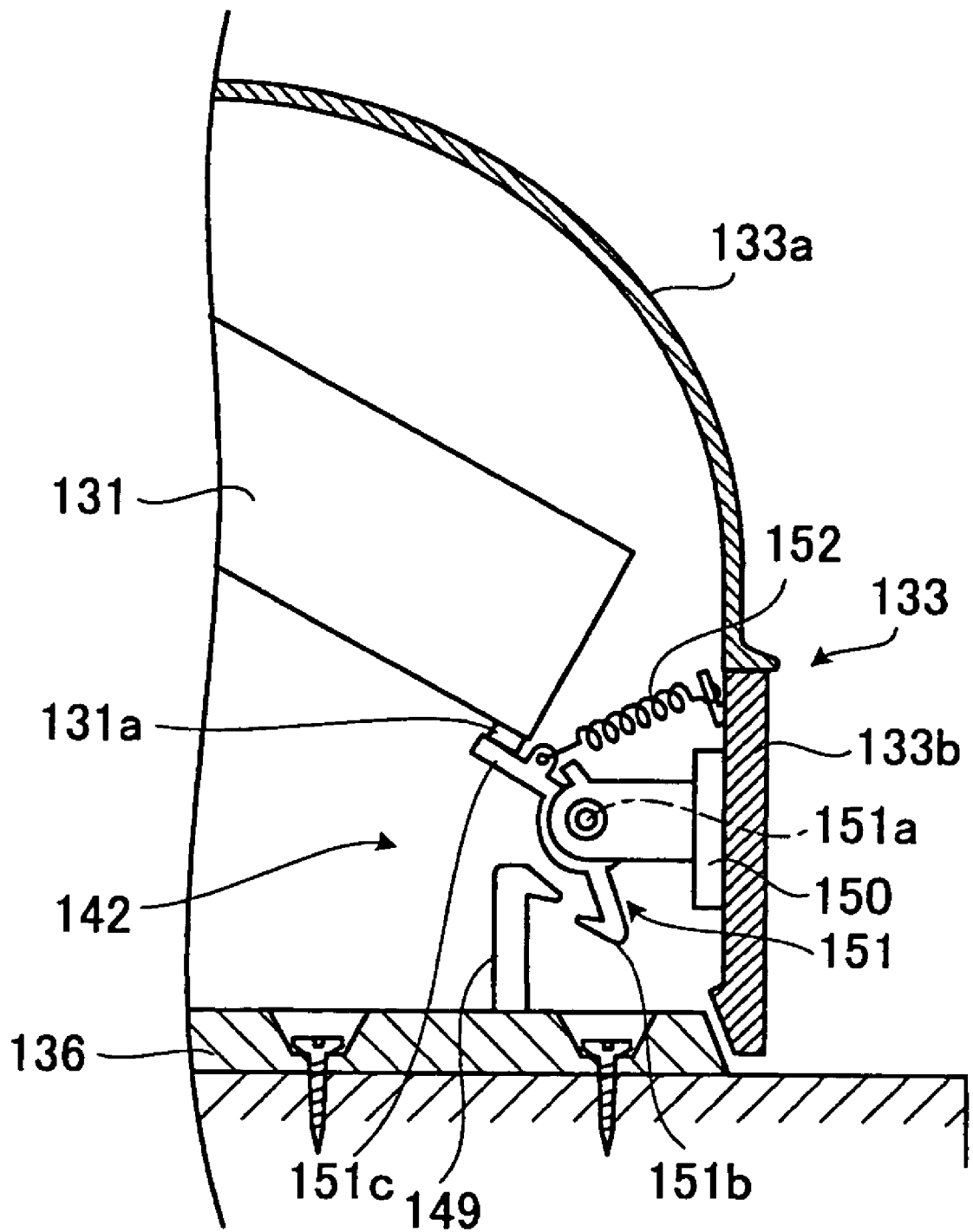
FIG. 16 is a fragmentary and enlarged cross-sectional view of coupling means forming part of the surveillance camera apparatus shown in FIG. 14 and showing the camera unit and the coupling means out of engagement with each other.

The coupling means 142 is then operated to have the cylindrical portion 133b of the dome cover 133 disengaged out of the stationary member 136 of the camera retaining assembly 132 so that the dome cover 133 can be decoupled from the surveillance camera apparatus 130 as best shown in FIG. 16.

As will be seen from the above description, the fifth preferred embodiment of the surveillance camera apparatus according to the present invention can take advantage the non-surveillance area to ensure the operation to couple and decouple the dome cover with the surveillance camera apparatus, while the camera unit is moved in the surveillance area to perform a surveillance operation.

Figure 18:
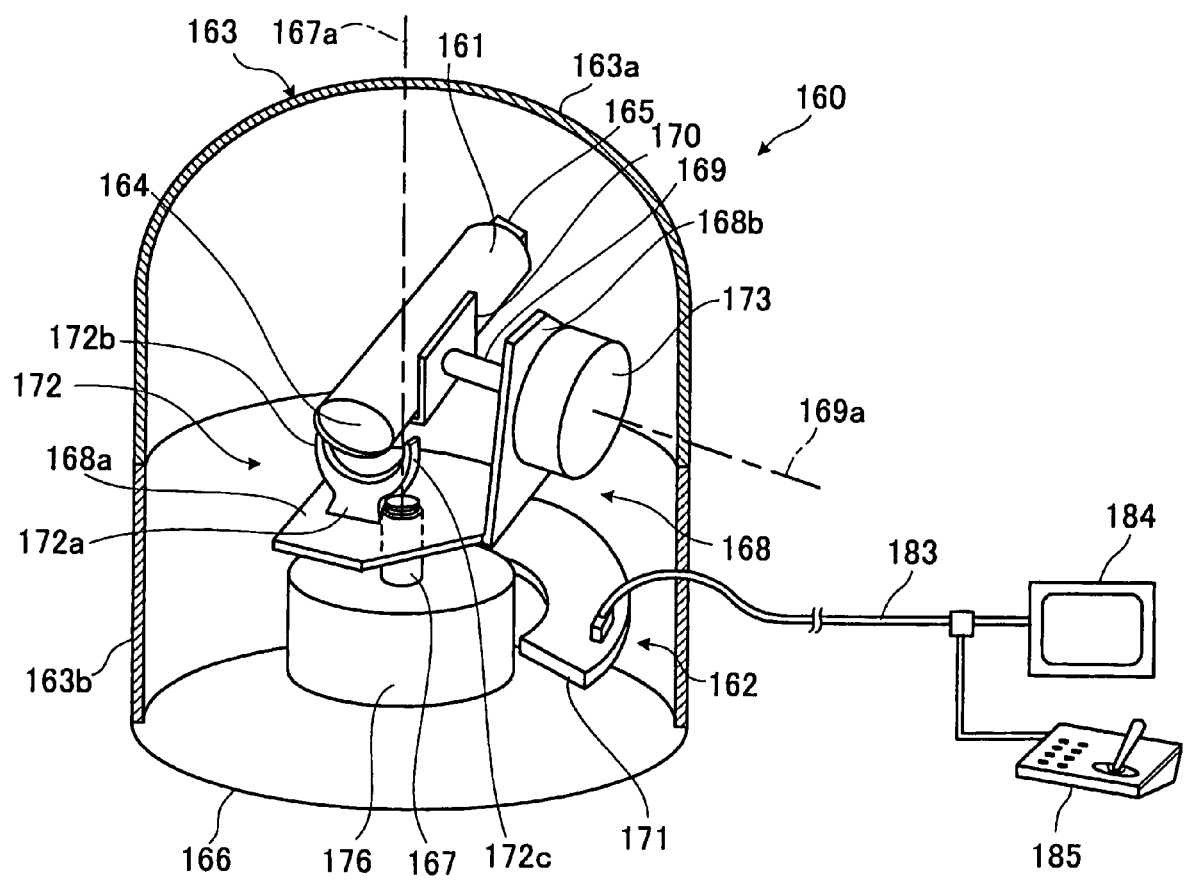
FIG. 18 is a perspective view of a sixth preferred embodiment of the surveillance camera apparatus according to the present invention showing a dome cover partly fragmentary and a camera unit and a locking unit out of engagement with each other.
Figure 19:
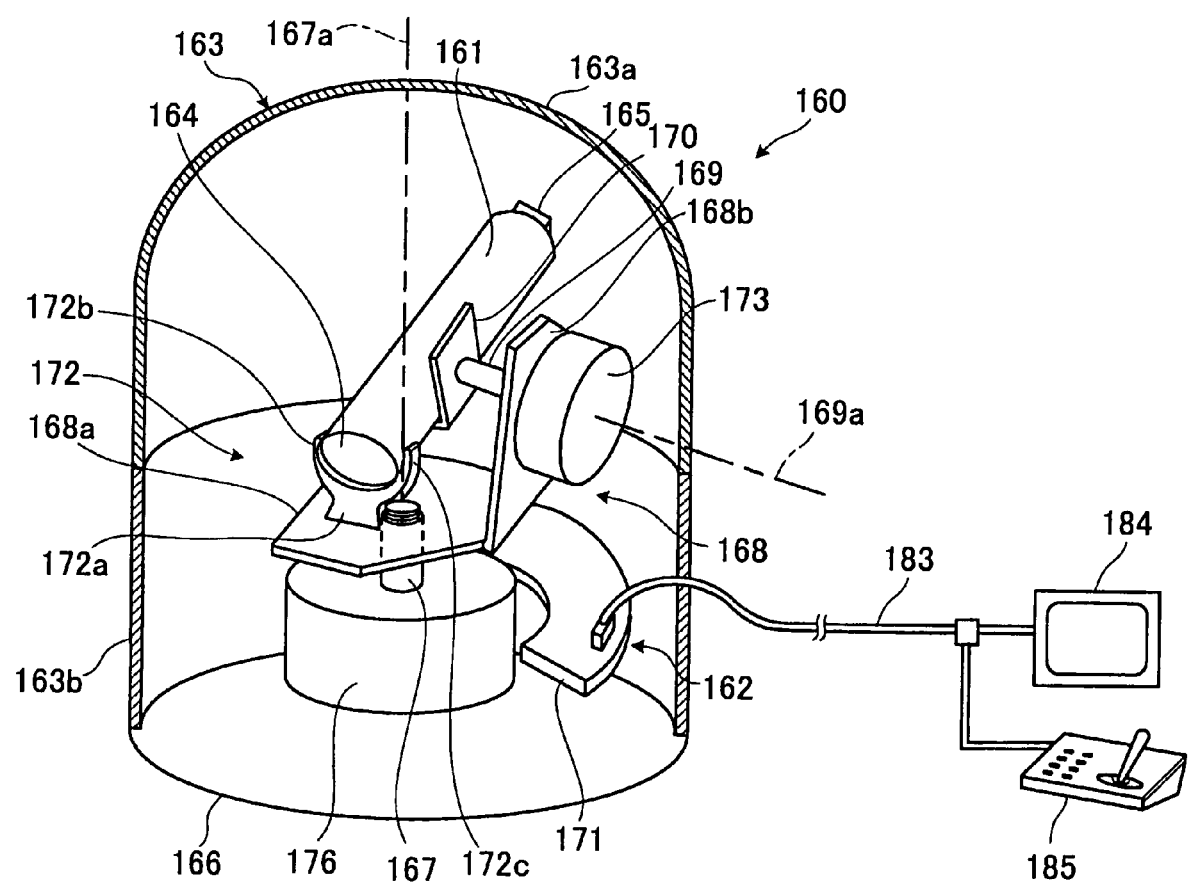
FIG. 19 is a perspective view similar to FIG. 18 but showing the camera unit and the locking unit in engagement with each other.
Figure 20:
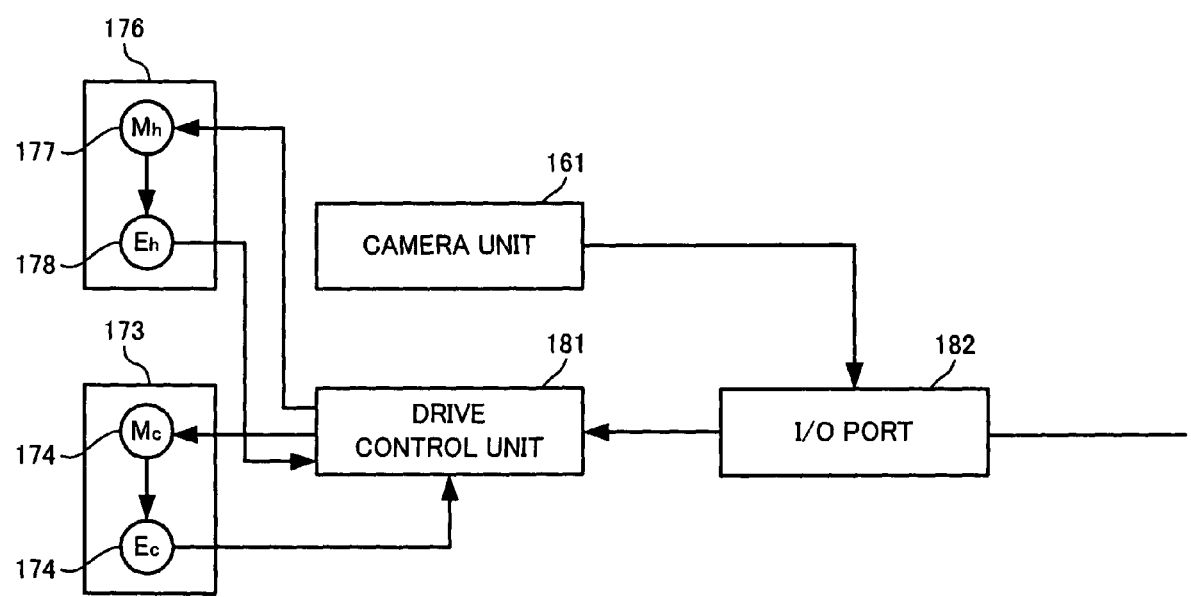
FIG. 20 is a block diagram of the surveillance camera apparatus according to the present invention shown in FIGS. 18 and 19.
Figure 21:
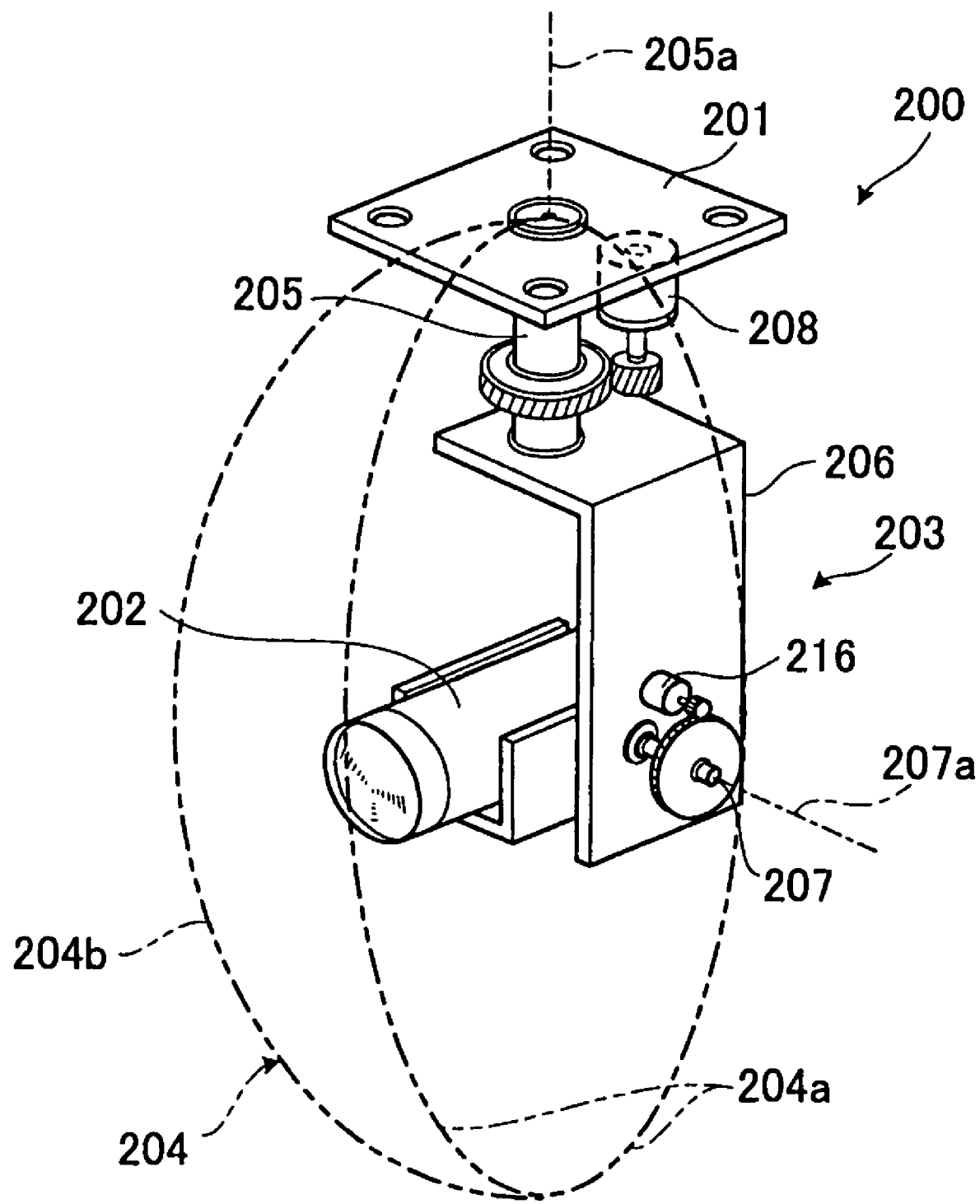
FIG. 21 is a perspective view of a conventional surveillance camera apparatus with a dome cover removed from the surveillance camera apparatus.
Figure 22:
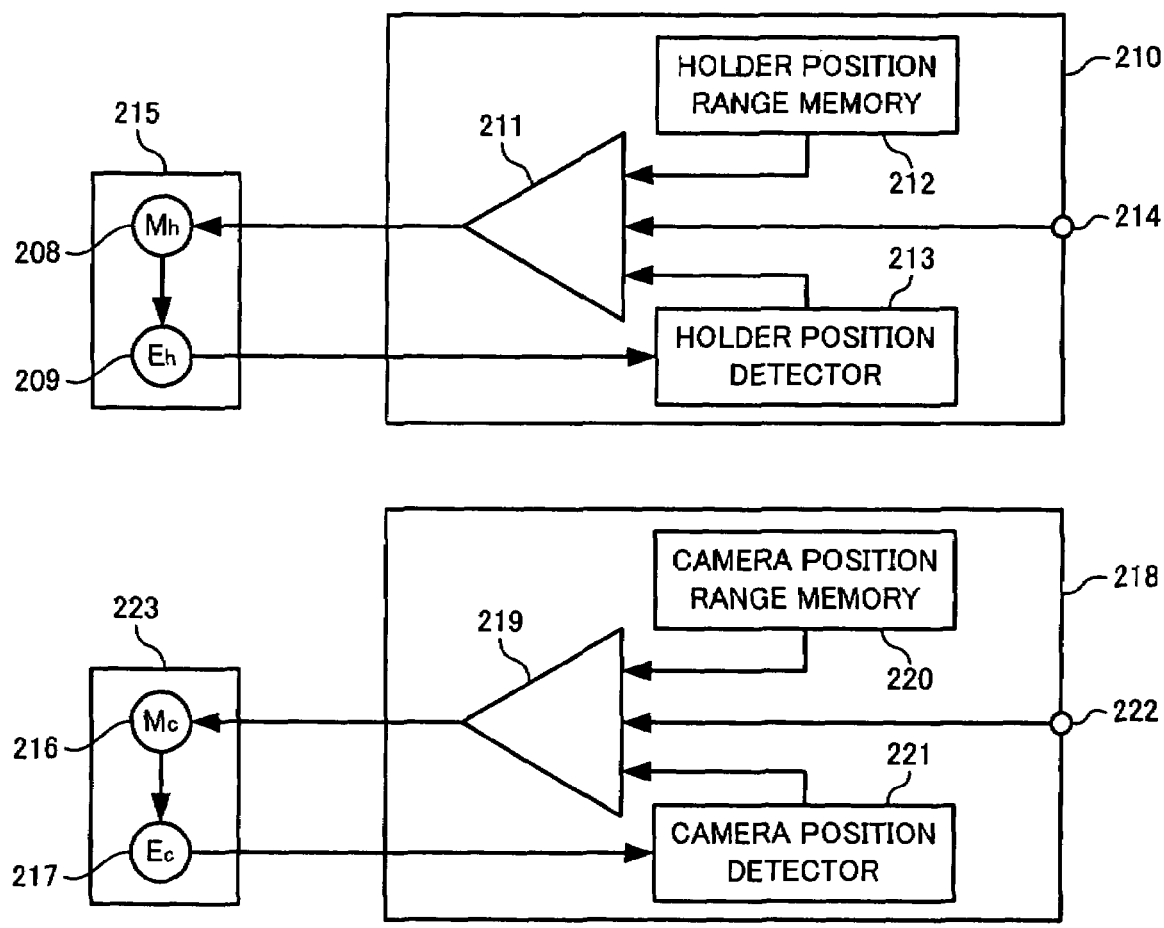
FIG. 22 is a block diagram of the conventional surveillance camera apparatus shown in FIG. 21.

Referring now to the drawings, in particular to FIGS. 18 to 20, there is shown a sixth preferred embodiment of the surveillance camera apparatus according to the present invention. Throughout the following detailed description, similar reference numbers refer to respective similar elements or parts in all figures of the drawings.

The sixth preferred embodiment of the surveillance camera apparatus is shown in FIGS. 18 to 20 as having a reference number 160, and comprises a camera unit 161 for taking an image of a specific object, a camera retaining assembly 162 for retaining the camera unit 161, and a dome cover 163 mounted on the camera retaining assembly 162 to cover the camera unit 161. The camera unit 161 is operative to produce an image signal indicative of the image taken by the camera unit 161, and includes a lens 164 having a light axis and capable of passing therethrough light forming the image taken by the camera unit 161, and a charge coupled device unit 165 having a plurality of charge coupled devices to translate the light passed through the lens 164 to the image signal.

The camera retaining assembly 162 includes a stationary member 166 secured to a fixed structure such as for example a ceiling wall forming part of a building, and a side wall forming part of an elevator cage, a holder shaft 167 revolvably supported on the stationary member 166 and having a holder revolution axis 167a around which the holder shaft 167 is revolvable with respect to the stationary member 166, a holder member 168 in the form of L-shape in cross-section and having a first plate portion 168a fixedly mounted on the holder shaft 167 and a second plate portion 168b perpendicular to and integrally formed with the first plate portion 168a, and a camera shaft 169 revolvably supported on the second plate portion 168b of the holder member 168 and having a camera revolution axis 169a in perpendicular relationship with the holder revolution axis 167a of the holder shaft 167 and around which the camera shaft 169 is revolvable with respect to the holder member 168, a channel member 170 securely mounted on the camera shaft 169 to hold the camera unit 161.

The surveillance camera apparatus 160 further comprises a camera locking unit 172 securely mounted on the camera retaining assembly 162 to have the camera unit 161 lockable with the camera retaining assembly 162 when the camera unit 161 is moved with respect to the camera retaining assembly 162 into the non-surveillance area which will be described hereinafter in detail. The camera locking unit 172 has a base portion 172a securely connected to the first plate portion 168a of the holder member 168. The camera locking unit 172 has bifurcated finger portions 172b and 172c having end surfaces partly in the form of a spherical shape to ensure that the camera unit 161 is locked by the camera locking unit 172 with the cylindrical body of the camera unit 161 partly received by the bifurcated finger portions 172b and 172c. The bifurcated finger portions 172b and 172c of the camera locking unit 172 is made of an elastic material, and the end surface of the bifurcated finger portions 172b and 172c is partly formed to have a diameter smaller than that of the cylindrical body of the camera unit 161 to ensure that the camera unit 161 is locked by the camera locking unit 172 with the cylindrical body of the camera unit 161 partly received by the bifurcated finger portions 172b and 172c when the camera unit 161 is moved with respect to the camera retaining assembly 162 into the non-surveillance area.

The holder shaft 167 has a first end portion revolvably connected to the stationary member 166, and a second end portion securely connected to the holder member 168 to ensure that the holder member 168 is revolvable with respect to the stationary member 166 around the holder revolution axis 167a. The camera shaft 169 has a fixed end portion revolvably connected to the holder member 168 and a free end portion extending from the holder member 168 to securely support the channel member 170 to ensure that the camera unit 161 is revolvable with respect to the holder member 168 around camera revolution axis 169a. The first plate portion 168a of the holder member 168 has an outer surface paralleled to that of the stationary member 166, and the second plate portion 168b of the holder member 168 has an outer surface perpendicular to that of the first plate portion 168a.

The camera retaining assembly 162 further comprises a support plate 171 securely supported on first plate portion 168a of the holder member 168 to be revolvable together with the holder member 168.

The dome cover 163 includes a dome portion 163a partly in the form of a spherical shape and made of a transparent material, and a cylindrical portion 163b integrally formed with the dome portion 163a and made of a transparent material or a non-transparent material.

The surveillance camera apparatus 160 further comprises a camera driving unit 173 securely supported on the holder member 168 of the camera retaining assembly 162 to drive the camera unit 161 to have the camera unit 161 revolvably moved around the camera revolution axis 169a with respect to the holder member 168 of the camera retaining assembly 162 in two different areas consisting of a surveillance area where the camera unit 161 is capable of taking the image of the specific object to perform a surveillance operation, and a non-surveillance area where the camera unit 161 is incapable of taking the image of the specific object to perform no surveillance operation.

The camera driving unit 173 includes a camera electric motor 174 (see FIG. 20) for transmitting revolution torques to the camera shaft 169 to have the camera unit 161 revolve around the camera revolution axis 169a with respect to the holder member 168 of the camera retaining assembly 162, and a camera encoder 175 (see FIG. 20) for counting and encoding the revolution number of the camera electric motor 174. It is preferable that the camera electric motor 174 and the camera encoder 175 be combined to be constituted by a step-motor.

The surveillance camera apparatus 160 further comprises a holder driving unit 176 securely supported on the stationary member 166 of the camera retaining assembly 162 to drive the holder member 168 of the camera retaining assembly 162 to have the holder member 168 of the camera retaining assembly 162 revolvably moved with respect to the stationary member 166 of the camera retaining assembly 162. The holder driving unit 176 includes a holder electric motor 177 (see FIG. 20) for transmitting revolution torques to the holder shaft 167 to have the holder member 168 of the camera retaining assembly 162 revolve around the holder revolution axis 167a with respect to the stationary member 166 of the camera retaining assembly 162, and a holder encoder 178 (see FIG. 20) for counting and encoding the revolution number of the holder electric motor 177. It is preferable that the holder electric motor 177 and the holder encoder 178 be combined to be constituted by a step-motor.

The surveillance camera apparatus 160 further comprises a drive control unit 181 (see FIG. 20) securely mounted on the support plate 171 of the camera retaining assembly 162 to control the camera driving unit 173 and the holder driving unit 176 to have the camera driving unit 173 drive the camera unit 161 to be moved with respect to the camera retaining assembly 162 in the two different areas.

The drive control unit 181 is operative to assume two different operation states consisting of a first operation state under which the camera unit 161 is moved within the surveillance area of the camera unit 161, and a second operation state under which the camera unit 161 is driven by the camera driving unit 173 to be moved within the non-surveillance area of the camera unit 161.

The surveillance camera apparatus 160 further comprises an I/O port 182 securely mounted on the support plate 171 of the camera retaining assembly 162, and electrically connected through an electric line 183 to an exterior apparatus having a monitor unit 184 and a controller 185. The I/O port 182 is designed to output the image signal produced by the camera unit 161 to the monitor unit 184 to have the monitor unit 184 display and record the image represented by the image signal. The I/O port 182 is adapted to input from the controller 185 a position signal for changing the position and posture of the camera unit 161, and first and second operation signals for respectively setting the drive control unit 181 to assume the first and second operation states.

The operation of the surveillance camera apparatus 160 will be described in detail hereinafter.

Under the condition that the drive control unit 181 assumes the first operation state, the camera unit 161 is driven by the camera driving unit 173 while the holder member 168 of the camera retaining assembly 162 is driven by the holder driving unit 176 when the position signal inputted from the controller 185 through the I/O port 182 is received by the drive control unit 181. At this time, the camera unit 161 is moved in the surveillance area with respect to the stationary member 166 of the camera retaining assembly 162.

The image of the specific object is then taken by the camera unit 161, and the image signal is produced by the camera unit 161. The image signal produced by the camera unit 161 is then outputted through the I/O port 182 to the monitor unit 184 for displaying and recording the image.

When the second operation signal is inputted through the I/O port 182 to the drive control unit 181, the drive control unit 181 assumes the second operation state. Under the condition that the drive control unit 181 assumes the second operation state, the camera unit 161 is driven by the camera driving unit 173 to be locked by the camera locking unit 172 in such a way that the cylindrical body of the camera unit 161 is then partly received by the bifurcated finger portions 172*b* and 172*c*.

As will be seen from the above description, the sixth preferred embodiment of the surveillance camera apparatus according to the present invention can take advantage the non-surveillance area to ensure the operation to lock the camera unit with the camera retaining assembly, while the camera unit is moved in the surveillance area to perform a surveillance operation.

While the present invention has thus been shown and described with reference to the specific embodiments, however, it should be noted that the invention is not limited to the details of the illustrated structures but changes and modifications may be made without departing from the scope of the appended claims.

What is claimed is:

1. A surveillance camera apparatus, comprising:
    a camera unit for taking an image of a specific object and having a lens for passing therethrough light forming said image taken by said camera unit;
    a camera retaining assembly for retaining said camera unit;
    a light filtering unit for filtering light forming image taken by said camera unit, said light filtering unit having a filter frame supported by said camera unit, and an optical filter fixed with said filter frame to cut part of light, and said filter frame being movable with respect to said camera unit to assume two different operation positions consisting of a first operation position where said optical filter covers said lens of said camera unit to allow said camera unit to be able to take said image with said optical filter, and a second operation position where said optical filter uncovers said lens of said camera unit to allow said camera unit to be able to take said image without said optical filter;
    frame stop means held stationary with respect to said camera retaining assembly and designed to stop said filter frame of said light filtering unit from moving with respect to said camera retaining assembly beyond a predetermined range;
    a camera driving unit supported on said camera retaining assembly to drive said camera unit to have said camera unit moved with respect to said camera retaining assembly in two different areas consisting of a surveillance area where said camera unit is capable of taking said image of said specific object to perform a surveillance operation, and a non-surveillance area where said camera unit is incapable of taking said image of said specific object to perform no surveillance operation, and where said filter frame of said light filtering unit is capable of selectively assuming said two different operation positions, said camera driving unit being adapted to drive said camera unit to have said camera unit moved with respect to said camera retaining assembly to have said filter frame of said light filtering unit move into and out of engagement with said frame stop means; and
    a drive control unit for controlling said camera driving unit to have said camera driving unit drive said camera unit to have said camera unit moved with respect to said camera retaining assembly in said two different areas, said drive control unit being operative to assume two different operation states consisting of a first operation state under which said camera unit is driven by said camera driving unit to be moved within said surveillance area, and a second operation state under which said camera unit is driven by said camera driving unit to be moved with respect to said camera retaining assembly to have said filter frame of said light filtering unit move into and out of engagement with said frame stop means, and which said filter frame of said light filtering unit is moved with respect to said camera retaining assembly to allow said filter frame of said light filtering unit to selectively assume said two different operation positions under the state that said filter frame of said light filtering unit is in engagement with said frame stop means.

2. A surveillance camera apparatus as set forth in claim 1, in which said optical filter of said light filtering unit cuts infrared-light.

3. A surveillance camera apparatus as set forth in claim 1, in which said camera retaining assembly includes:
    a stationary member; and
    a camera shaft revolvably supported on said stationary member and having a camera revolution axis around which said camera shaft is revolvable with respect to said stationary member, said camera shaft is driven in unison with said camera unit by said camera driving unit to have said camera unit revolvably moved around said camera revolution axis with respect to said stationary member.

4. A surveillance camera apparatus as set forth in claim 3, in which said camera unit includes:
    a cylindrical body having said lens accommodated therein, said filter frame of said light filtering unit positioned on said camera unit and including an arm frame portion having a front end, an intermediate portion, and a rear end, and a finger frame portion integrally formed with to extend downwardly of said front end of said arm frame portion to be capable of having said optical filter of said light filtering unit cover said lens of the camera unit, said intermediate portion having a pivotal axis around which said arm frame portion is pivotable with respect to said cylindrical body of said camera unit, and said rear end having a center ridge, and two cut faces separated from each other at said center ridge;

a pair of regulation members fixedly mounted on said cylindrical body of said camera unit and angularly spaced apart from each other to have said arm frame portion of said filter frame disposed therebetween, said regulating members having respective inner faces opposing to each other and radially extending to regulate the motion of said filter frame; and a resilient member fixedly mounted on said cylindrical body of said camera unit to be contactable with said cut faces of said rear end of said arm frame portion of said filter frame to resiliently urge said arm frame portion of said filter frame to regulate the movement of said filter frame, said resilient member having a resilient force so selected that said filter frame is movable with respect to said camera unit under the state that said filter frame of said light filtering unit is in engagement with said frame stop means, and that said filter frame is unmovable with respect to said camera unit under the state that said filter frame of said light filtering unit is out of engagement with said frame stop means.

5. A surveillance camera apparatus, comprising:

a camera unit for taking an image of a specific object and having a lens for passing therethrough light forming said image taken by said camera unit;

a camera retaining assembly for retaining said camera unit;

a light filtering unit for filtering light forming said image taken by said camera unit, said light filtering unit having a filter frame supported by said camera unit, and a plurality of optical filters fixed with said filter frame and designed to cut part of light, and said filter frame being movable with respect to said camera unit to assume a plurality of operation positions where each of said optical filter covers said lens of said camera unit to allow said camera unit to be able to take said image with each of said optical filter;

frame stop means held stationary with respect to said camera retaining assembly and designed to stop said filter frame of said light filtering unit from moving with respect to said camera retaining assembly beyond a predetermined range;

a camera driving unit supported on said camera retaining assembly to drive said camera unit to have said camera unit moved with respect to said camera retaining assembly in two different areas consisting of a surveillance area where said camera unit is capable of taking said image of said specific object to perform a surveillance operation, and a non-surveillance area where said camera unit is incapable of taking said image of said specific object to perform no surveillance operation, and where said filter frame of said light filtering unit is capable of selectively assuming said operation positions, said camera driving unit being adapted to drive said camera unit to have said camera unit moved with respect to said camera retaining assembly to have said filter frame of said light filtering unit moved into and out of engagement with said frame stop means; and a drive control unit for controlling said camera driving unit to have said camera driving unit drive said camera unit to have said camera unit moved with respect to said camera retaining assembly in said two different areas, said drive control unit being operative to assume two different operation states consisting of a first operation state under which said camera unit is driven by said camera driving unit to be moved within said surveillance area, and a second operation state under which said camera unit is driven by said camera driving unit to be moved with respect to said camera retaining assembly to have said filter frame of said light filtering unit move into and out of engagement with said frame stop means, and which said filter frame of said light filtering unit is moved with respect to said camera retaining assembly to allow said filter frame of said light filtering unit to selectively assume said different operation positions under the state that said filter frame of said light filtering unit is in engagement with said frame stop means.

* * * * *